US006965900B2

(12) United States Patent
Srinivasa et al.

(10) Patent No.: US 6,965,900 B2

(45) Date of Patent: Nov. 15, 2005

(54) METHOD AND APPARATUS FOR ELECTRONICALLY EXTRACTING APPLICATION SPECIFIC MULTIDIMENSIONAL INFORMATION FROM DOCUMENTS SELECTED FROM A SET OF DOCUMENTS ELECTRONICALLY EXTRACTED FROM A LIBRARY OF ELECTRONICALLY SEARCHABLE DOCUMENTS

(75) Inventors: Narayan Srinivasa, Moorpark, CA (US); Swarup S. Medasani, Thousand Oaks, CA (US); Yuri Owechko, Newbury Park, CA (US); Deepak Khosla, Calabasas, CA (US)

(73) Assignee: X-Labs Holdings, LLC, Santa Clara, CA (US)

( * ) Notice: Subject to any disclaimer, the term of this patent is extended or adjusted under 35 U.S.C. 154(b) by 491 days.

(21) Appl. No.: 10/026,065

(22) Filed: Dec. 19, 2001

(65) Prior Publication Data

US 2003/0115189 A1 Jun. 19, 2003

(51) Int. Cl.[7] .................................................. G06F 17/30

(52) U.S. Cl. .............................. 707/102; 707/3; 707/5; 707/10; 707/101; 707/103; 707/104

(58) Field of Search .......................... 707/3, 5, 10, 100, 707/101, 102, 103, 104, 4; 711/100; 715/530; 704/10

(56) References Cited

U.S. PATENT DOCUMENTS

| | | | | |
|---|---|---|---|---|
| 4,839,853 A | | 6/1989 | Deerwester et al. | |
| 5,675,710 A | | 10/1997 | Lewis | |
| 5,675,819 A | * | 10/1997 | Schuetze | 704/10 |
| 5,960,406 A | | 9/1999 | Rasansky et al. | |
| 6,018,343 A | | 1/2000 | Wang et al. | |
| 6,263,335 B1 | * | 7/2001 | Paik et al. | 707/5 |
| 6,446,061 B1 | * | 9/2002 | Doerre et al. | 707/3 |
| 6,560,597 B1 | * | 5/2003 | Dhillon et al. | 707/4 |
| 6,629,097 B1 | * | 9/2003 | Keith | 707/5 |
| 6,651,218 B1 | * | 11/2003 | Adler et al. | 715/530 |
| 6,678,690 B2 | * | 1/2004 | Kobayashi et al. | 707/101 |
| 6,778,979 B2 | * | 8/2004 | Grefenstette et al. | 707/3 |
| 2002/0112114 A1 | * | 8/2002 | Blair et al. | 711/100 |
| 2002/0138492 A1 | * | 9/2002 | Kil | 707/100 |
| 2003/0033287 A1 | * | 2/2003 | Shanahan et al. | 707/3 |

FOREIGN PATENT DOCUMENTS

EP 0687987 A1 * 12/1995

OTHER PUBLICATIONS

Y. Yang, J. G. Carbonell, R. D. Brown, T. Pierce, B. T. Archibald, and X. Liu, Learning Approaches for Detecting and Tracking News Events, IEEE Intelligent Systems, pp 32–43, Jul./Aug., 1999.

(Continued)

*Primary Examiner*—Thuy N. Pardo

(74) *Attorney, Agent, or Firm*—Jones Day

(57) ABSTRACT

An apparatus and method provides application specific multidimensional information to an application running on a user computing device from a plurality of member documents electronically extracted from a library of electronically searchable documents. An information extractor is adapted to extract occurrences of prospective representations of dimensions of application specific multidimensional information and occurrences of non-application specific multidimensional information from the member documents. Also, an encoder is adapted to encode the occurrences of prospective dimensions of application specific and non-application specific multidimensional information contained in member documents. A member document identifier determines document formatting and decides whether to proceed with further processing. An information verification unit optionally verifies the extraction of application specific multidimensional information from the member documents. A database optionally stores and provides access to the application specific multidimensional information, which may for example be scheduled events having dimensions of time, location, identity.

261 Claims, 15 Drawing Sheets

OTHER PUBLICATIONS

J. Allan et al., Topic Detection and Tracking Pilot Study: Final Report, DARPA Broadcast News Transcription and Understanding Workshop, Morgan Kaufmann, San Francisco, 1998, pp 194–218.

G. Barish, C. A. Knoblock, Y. S. Chen, S. Minton, A. Philpot, and C. Shahabi, Theaterloc: A case study in information integration, In IJCAI Workshop on Intelligent Information Integration, Stockholml, Sweden, 1999.

S. Slattery and M. Craven, Combining statistical and relational methods for learning in hypertext domains. In Proc. Of the 8th international conference on Inductive Logic Programming (ILP–98), 1998.

R. Ghani, R. Jones, D. Mladenic, K. Nigam, S. Slattery, Data Mining on Symbolic Knowledge Extracted from the web, Proceedings of the KDD–2000 Workshop on Text Mining, pp. 29–36, Boston, MA, Aug., 2000.

E. Riloff, and R. Jones, Learning Dictionaries for Information Extraction Using Multi–Level Boot–strapping, In Proc. Of the sixteenth national conference on artificial intelligence, pp 1044–1149, The AAAI press/ MIT press, 1999.

J. R. Quinlan, and R. M. Cameron–Jones, Foil: A midterm report, In Proc. of the 12th European Conference on Machine Learning, 1993.

A. McCallum, K. Nigam, J. Rennie, and K. Seymore, Building Domain–Specific Search Engines with Machine Learning Techniques, AAAI–99 Spring Symposium on Intelligent Agents in Cyberspace (1999).

M. Grobelnik, D. Mladenic, and N. Milic–Frayling, Text Mining as Integration of Several Related Research Areas: Report on KDD–2000 Workshop on Text Mining, Sixth ACM International Conference on Knowledge Discovery and Data Mining, Aug. 20–23, 2000, Boston.

Ion Muslea. Extraction Patterns for Information Extraction Tasks: A Survey. In the AAAI Workshop, pag. 1–6, Orlando, Florida, 1999.

M. Craven, D. Dipasquo, D. Freitag, A. McCallum, T. Mitchell, K. Nigam, S. Slattery, Learning to Extract Symbolic Knowledge from the World Wide Web, Proceedings of the 15th National Conference on Artificial Intelligence (AAAI–98).

S. Soderland, Learning Text Analysis Rules for Domain Specific Natural Language Processing, Ph. D. Dissertation, Univ. of Massachusetts, Dept. of Computer Science, Technical Report 96–087.

D. Freitag, Information Extraction from HTML: Application of a General Machine learning Approach, In Proceedings of the 15th National Conference on Artificial Intelligence, pp. 517–523, 1998.

Doorenbos, R., Etzioni, O., Weld, D. S., A scalable comparison–shopping agent for the world wide web, in proc. Of the first international conference on autonomous agents, 1997.

Perkowitz, M. and Etzioni, O., Category Translation: Learning to Understand Information on the Internet. In Proc. 15th International Joint Conference on Artificial Intelligence, 1995.

S. Soderland, Learning to Extract Text–Based Information from the World Wide Web, In Proceddings Of The Third International Conference Of Knowledge Discovery And Data Mining, KDD–1997.

IBM Intelligent Miner for Text [http://www–4.ibm.com/software/data/iminer/fortext/index.html].

Microsoft Hailstorm [http://www.microsoft.com/net/hailstorm.asp].

N. Kushmerick, D. Weld, and R. Doorenbos, Wrapper Induction for Information Extraction, In Proc. Of the 15th International Conference on Artificial Intelligence, pp 729–735, 1997.

S. Soderland, Learning information extraction rules for semi–structured and free text. Machine Learning, 34, 233–272, 1999.

M. Califf, and R. Mooney, Relational Learning of Pattern-Match Rules for Information Extraction, Working Papers of the ACL–97 Workshop in Natural Language Learning, pp 9–15, 1997.

S. Soderland, D. Fisher, J. Aseltine, W. Lehnert, Crystal Inducing A Conceptual Dictionary, Proc. Of The 14th International Joint Conference on Artificial Intelligence, pp 1314–1319, 1995.

P. Clark, and T. Niblett, The CN2 Induction Algorithm, Machine Learning, 3(4), pp 261–263, 1989.

J. R. Quinlan, C4.5: Programs for Machine Learning, Morgan Kaufmann, Los Altos, CA, 1992.

Ah–Hwee Tan, Text Mining: The state of the art and the challenges, ahhwee@krdl.org.sg.

* cited by examiner

PGA TOUR SENIOR PGA TOUR BUY.COM TOUR LPGA EUROPEAN PGA
TOUR golf golfing tournaments golf balls sports golf courses tee times
golf companies Masters US Open U.S. Open PGA Championship TPC World
Championships of Golf British Open Pebble Beach Tiger Woods Greg Norman Fred
Couples Davis Love III John Daly David Duval Ernie Els Tom Lehman Justin
Leonard Phil Mickelson Arnold Palmer Jack Nicklaus Byron Nelson PGA TOUR
SENIOR PGA TOUR BUY.COM TOUR LPGA EUROPEAN PGA TOUR golf
golfing tournament golf balls golf clubs sports golf courses tee times golf
companies Masters US Open U.S. Open PGA Championship TPC world
Championships of Golf British Open Pebble Beach Tiger Woods Greg Norman Fred
Couples Davis Love III John Daly David Duval Ernie Els Tom Lehman Justin
Leonard Phil Mickelson Arnold Palmer Jack Nicklaus Byron Nelson PGA TOUR
golfing tournaments golf balls golf clubs golf courses tee times golf companies
sports stats scores news Tiger Woods PGA PGA PGA Jack Nicklaus Golf
PGATour.com golfCBS Sports Olympics winter olympics Nagano NFL NFL
football AFC AFC football NFL on CBS Super Bowl times races events iaaf track
field dashes grand prix cbs television sports cbs tv CBS coverage sports
television listings weekend events cbs sports television TV listings sports
programming television programming golf fantasy golf free fantasy golf Golf fantasy
sports tiger woods free fantasy sports golf games golf game free golf games free on-
line golf tournament golf free golf league free sports league internet golf free internet
golf

| | | Document | | | | |
|---|---|---|---|---|---|---|
| Term No. | Term | 1 | 2 | 3 | 4 | 5 |
| 1 | +fantasy | 0 | 0 | 0 | 0 | 0 |
| 2 | AFC | 0 | 0 | 0 | 0 | 0 |
| 3 | American | 0 | 0 | 0 | 0 | 0 |
| 4 | amp | 0 | 0 | 0 | 0 | 0 |
| 5 | Andersen | 0 | 0 | 0 | 0 | 0 |
| 6 | Annika | 1 | 1 | 0 | 0 | 1 |
| 7 | Architects | 0 | 0 | 0 | 0 | 0 |
| 8 | Architecture | 0 | 0 | 0 | 0 | 0 |
| 9 | Arnold | 0 | 0 | 0 | 0 | 0 |
| 10 | athletics | 0 | 0 | 0 | 0 | 0 |
| 11 | Audio | 4 | 4 | 1 | 1 | 0 |
| 12 | Auto | 0 | 0 | 0 | 0 | 0 |
| 13 | Baird | 0 | 0 | 0 | 0 | 0 |
| 14 | balls | 0 | 0 | 0 | 0 | 0 |
| 15 | baseball | 0 | 0 | 0 | 0 | 0 |
| 16 | Basketball | 0 | 0 | 0 | 1 | 0 |
| 17 | Beach | 0 | 0 | 0 | 0 | 0 |

MOST SIGNIFICANT VECTOR 262

LEAST SIGNIFICANT VECTOR 264

266 268 270 240 272 280 240 282 284 240 280 290

| Term | U1 | Term | U2 | Term | U3 | Term | U143 |
|---|---|---|---|---|---|---|---|
| TOUR | −0.709527 | golf | 0.505325 | CLASSIC | −0.521767 | amp | 0.215532 |
| PGA | −0.536327 | CLASSIC | 0.344658 | golf | 0.466427 | Bowling | −0.193455 |
| golf | −0.250945 | Woods | 0.3389 | Open | −0.36307 | Glasson | 0.188997 |
| SENIOR | −0.216452 | Open | 0.321522 | PGA | 0.256941 | Glen | −0.160184 |
| players | −0.118856 | PGA | −0.30569 | Woods | 0.235053 | Furyk | 0.150734 |
| Open | −0.088181 | Tiger | 0.256206 | TOUR | −0.202793 | Auto | −0.150497 |
| CLASSIC | −0.083555 | Masters | 0.230828 | Tiger | 0.192401 | Daly | −0.149451 |
| tournament | −0.074531 | Championship | 0.145056 | Championship | −0.190289 | Bies | 0.148737 |
| tee | −0.073739 | TOUR | −0.144758 | SENIOR | −0.160201 | Inkster | −0.148239 |
| pro | −0.065461 | Audio | 0.115836 | Masters | 0.123855 | Love | 0.147922 |
| World | −0.059491 | LPGA | 0.090278 | O | −0.120203 | S | −0.146052 |
| LPGA | −0.058072 | World | 0.090209 | sports | 0.10208 | companies | −0.142221 |
| tournaments | −0.057108 | WORLDCOM | 0.089487 | Play | −0.072621 | athletics | 0.134828 |
| EUROPEAN | −0.055566 | Play | 0.080428 | free | 0.06532 | College | 0.131998 |
| equipment | −0.05216 | tee | 0.075594 | U | −0.061127 | baseball | −0.126656 |
| Official | −0.047328 | EUROPEAN | 0.071835 | fantasy | 0.060842 | league | 0.122512 |
| events | −0.046162 | Official | −0.064779 | EUROPEAN | −0.054842 | Consulting | 0.121546 |
| Championship | −0.045321 | O | 0.06464 | clubs | 0.054342 | Cyberviewer | −0.119411 |

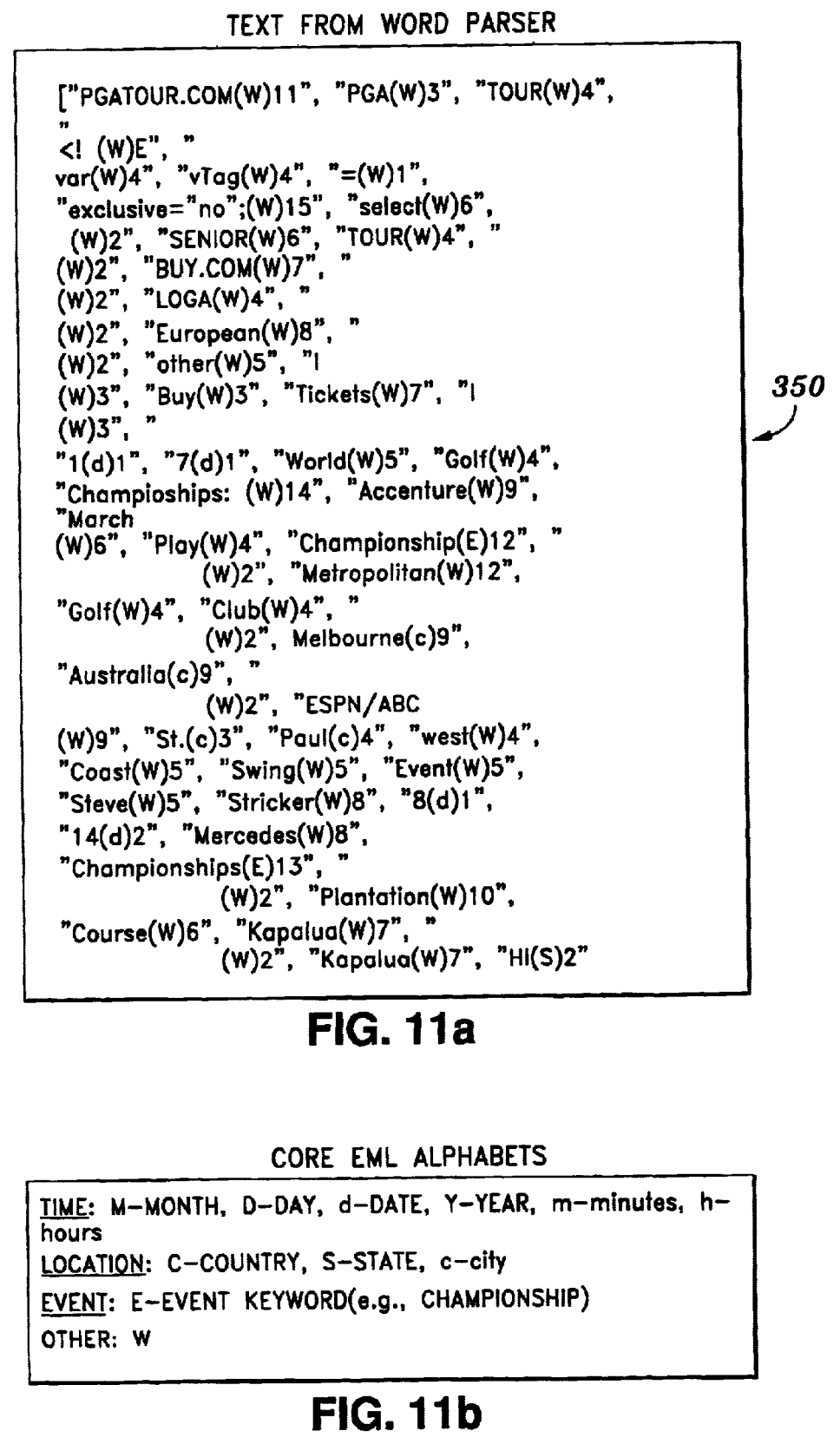

TEXT FROM WORD PARSER

```
["PGATOUR.COM(W)11", "PGA(W)3", "TOUR(W)4",
"
<! (W)E", "
var(W)4", "vTag(W)4", "=(W)1",
"exclusive="no";(W)15", "select(W)6",
 (W)2", "SENIOR(W)6", "TOUR(W)4", "
(W)2", "BUY.COM(W)7", "
(W)2", "LOGA(W)4", "
(W)2", "European(W)8", "
(W)2", "other(W)5", "I
(W)3", "Buy(W)3", "Tickets(W)7", "I
(W)3", "
"1(d)1", "7(d)1", "World(W)5", "Golf(W)4",
"Champioships: (W)14", "Accenture(W)9",
"March
(W)6", "Play(W)4", "Championship(E)12", "
              (W)2", "Metropolitan(W)12",
"Golf(W)4", "Club(W)4", "
              (W)2", Melbourne(c)9",
"Australia(c)9", "
              (W)2", "ESPN/ABC
(W)9", "St.(c)3", "Paul(c)4", "west(W)4",
"Coast(W)5", "Swing(W)5", "Event(W)5",
"Steve(W)5", "Stricker(W)8", "8(d)1",
"14(d)2", "Mercedes(W)8",
"Championships(E)13", "
               (W)2", "Plantation(W)10",
"Course(W)6", "Kapalua(W)7", "
               (W)2", "Kapalua(W)7", "HI(S)2"
```

CORE EML ALPHABETS

TIME: M-MONTH, D-DAY, d-DATE, Y-YEAR, m-minutes, h-hours
LOCATION: C-COUNTRY, S-STATE, c-city
EVENT: E-EVENT KEYWORD(e.g., CHAMPIONSHIP)
OTHER: W

FIG. 11b

EML BASED ENCODING OF TEXT ABOVE

WORD CO-OCCURENCE MODELS FOR GOLF EVENTS

TIME: MdMd, dMd, Mdd, dd=T
LOCATION: cC,csC, cS, S, C=L
EVENT: E
OTHER: Wn

EML BASED ENCODING WITH INTER-LEVEL
WORD CO-OCCURRENCE MODELS FOR GOLF

Scheduled Event Page

EXTRACTED TIMES, LOCATIONS, CATEGORIES AND INFO

TLC#1: ["April 2 8", " Masters Tournament", "GA", "Augusta National Golf Club Augusta"]

TLC#2: ["April 16 22", " Shell Houston Open", "TX", "TPC at Woodlands"]

TLC#3: ["April 23 29", " Greater Greensboro Chrysler Classic", "NC", "Forest Oaks Country Club Greensboro"]

TLC#4: ["June 4 10", " FedEx St. Jude Classic", "TN", "TPC at Southwind Memphis "]

TLC#5: ["June 14 17", " U.S. Open Championships* )USGA Tournament", "Ok", "Southern Hills Country Club Tulsa "]

TLC#6: ["June 18 24", "Buick Classic", NY", "Westchester Country Club Harrison "]

TLC#7: ["June 25 July 1 ", " Canon Greater Hartford Open", "CT", "TPC at River Highlands Cromwell "]

TLC#8: [July 16 22", " B.C. Open", "NY", "En Joie Golf Club Endicott "]

TLC#9: ["July 30 Aug. 5 ", " Inrernational", "CO", " Castle Pines Golf Club Castle Rock "]

FIG. 14b

METHOD AND APPARATUS FOR ELECTRONICALLY EXTRACTING APPLICATION SPECIFIC MULTIDIMENSIONAL INFORMATION FROM DOCUMENTS SELECTED FROM A SET OF DOCUMENTS ELECTRONICALLY EXTRACTED FROM A LIBRARY OF ELECTRONICALLY SEARCHABLE DOCUMENTS

FIELD OF THE INVENTION

The present invention relates to the field of electronic searching of libraries of searchable documents, for example, pages of documents maintained on web-pages accessible over a communication network, e.g., the Internet, in order to extract application specific multi-dimensional data.

RELATED APPLICATIONS

The present application is related to concurrently filed applications by the same inventors, assigned to the same assignee the disclosures of which are hereby incorporated reference.

SOFTWARE SUBMISSION

Accompanying this Application as an Appendix thereto and incorporated by reference herein as is fully incorporated within this Application is a media copy of the software currently utilized by the applicants in the implementation of some or all of the presently preferred embodiments of the inventions disclosed and claimed in this Application.

BACKGROUND OF THE INVENTION

One of the most useful and successful applications for searching of the Internet (whether from a fixed location such as a desk-top computer/workstation or from a mobile device, e.g., from a personal computing assistant or hand held computing device) is for the provision of information to the user that is constrained in certain aspects, i.e., is multidimensionally constrained. This could be, e.g., scheduled-event information that is constrained by both location and time, and also, e.g., by the type of event. People appreciate the power and convenience of the Internet (sometimes referred to as its subset, the World Wide Web or simply the Web) in collecting such types of information, e.g., for the purpose of populating personal event calendars with the extracted event information. The information is thus application specific, i.e., it is used with an application resident on the user's computing device, e.g., the calendar, and it is multidimensionally constrained, e.g., for a specific time and a specific location for a specific event from a selected type of events or multiple types of events, e.g., sporting events and entertainment events and the like.

This is evidenced by the popularity of websites such as digitalcity.com that provide information on cultural events for various cities. The Vindigo.com service, which has over 500,000 users, and has demonstrated that obtaining location-based event information on a PDA in real-time is very popular with mobile users. Yet, for all its power, searching libraries of searchable documents containing relevant information, e.g., web-pages on the Internet for interesting events that fit the user's time and location constraints, can still require too much effort and frustration on the part of the user, especially if the user's interests singularly or collectively do not fit the relatively few categories available on any single web-site or even a relatively few web-sites.

Will "Phantom of the Opera" be playing anywhere in South Dakota this fall, and if so, can the user fit it into the user's schedule? Trying to answer this question today requires a lot of energy and time visiting multiple search engines and following links. It would be much more convenient to be automatically notified of events of interest to the user, regardless of whether or not they are too obscure to be listed on the existing Web calendar sites.

General-purpose search engines on the Web that search based on specific keywords or patterns of links are well known, for example Google.com, AltaVista.com, HotBot.com, etc. They do not, however, have the ability to push events to users based on their interests. Additionally, at present, the web-sites that do exist that are capable of searching and retrieving event information in a few select categories, retrieve information from an event database that is manually compiled and updated using event lists from specific content providers, such as SportsTicker, MovieFone, etc. This severely limits the scope of event information available from these sites. Because of the manual compilation and scaling issues, the categories are necessarily broad and limited to the most popular ones. The power of the Internet lies in its ability to supply very specialized data to large numbers of users economically and tailored to each individual's needs. Existing content-oriented, e.g. event-oriented, Web information services have not shown the ability to exploit the full power of the Internet.

Thus the need exists for a content-oriented, e.g., scheduled-event oriented, Internet service that can automatically mine event information from the Web; organize it along the dimensions of selected constraints of a multidimensional set of application specific constraints, e.g., location, time, and category dimensions; and supply it in customized fashion to each user, e.g., that is useable directly by an application resident on the user's personal computing device, including over the Internet, via, e.g., fixed wire or wireless communication. By automating the collection of the multidimensional information, e.g., the event information, scaling properties will be greatly improved and the category quantization can be much finer, which means a much better match can be made with the user's particular application, e.g., with the user's specific sporting, entertainment, or professional interests and availability according to the user's schedule. Users of both fixed and mobile computing/information devices can, therefore, have a versatile and convenient service for retrieving application specific information, e.g., event information directly from queries made by the user applicable to specific types of information, and, if the user desires, for automatically pushing the application specific information, e.g., event information to the user's calendar. The application specific multidimensional information which matches the user's specific application requirements can be provided automatically and dynamically and utilized by the user's specific application program to automatically and dynamically provide the user with the desired final information, e.g., the placement on the user's electronic calendar of an event of interest to the user and which is not in conflict with the user's existing schedule and/or should be evaluated by the user to select between the newly added event and an already scheduled event. Overloading the user with irrelevant or uninteresting information, e.g., event information and excessive searching under the user's direction of legions of information source locations, e.g., web-pages in web-sites on the Internet, can be eliminated.

At present there are several known methods of the automatic extraction of information from information source locations, e.g., web documents, i.e., web-pages on web-sites. Some of the examples are listed below. Y. Yang, J. G. Carbonell, R. D. Brown, T. Pierce, B. T. Archibald, and X Liu, Learning Approaches for Detecting and Tracking News Events, IEEE Intelligent Systems, pp 32–43, July/August, 1999 (the disclosure of which is hereby incorporated by reference) disclose the extension of some of the popular supervised and unsupervised learning algorithms to allow document classification based on the information content and temporal aspects of, e.g., news events. The disclosed system is capable of detecting relevant events from large volumes of news stories, presenting abstracts of events in a hierarchical fashion, and tracking events of interest based on a user given list of sample stories. This work is an example of topic detection and tracking as discussed in J. Allan et al, Topic Detection and Tracking Pilot Study: Final Report, DARPA Broadcast News Transcription and Understanding Workshop, Morgan Kaufmann, San Francisco, 1998, pp 194–218 (the disclosure of which is hereby incorporated by reference. In G. Barish, C. A. Knoblock, Y. S. Chen, S. Minton, A. Philpot, and C. Shahabi, Theaterloc: ACase Studyin Information Integration, in IJCAI Workshop on Intelligent Information Integration, Stockholm, Sweden, 1999 (the disclosure of which is hereby incorporated by reference), the authors present a technique to efficiently learn extraction rules for obtaining information about movie theatres and restaurants from Web-based entertainment guides. An approach to automatically learn prepositional rules to identify the name of a person given on their home page was disclosed in D. Freitag, Information Extraction from HTML: Application of a General Machine Learning Approach, in Proceedings of the 15th National Conference on Artificial Intelligence, pages 517–523, 1998 (the disclosure of which is hereby incorporated by reference).

Another approach concentrating on extracting relational information between pages on the web is disclosed in S. Slattery and M. Craven, Combining Statistical and Relational Methods for Learning in Hypertext Domains, in Proc. Of the $8^{th}$ International Conference on Inductive Logic Programming (ILP-98), 1998 (the disclosure of which is hereby incorporated by reference). In this work, the authors disclose the use of relational learning to identify advisor-advisee relations between faculty and graduate students using text and hyperlinks contained in the web pages. In R. Ghani, R. Jones, D. Mladenic, K. Nigam, S. Slattery, Data Mining on Symbolic Knowledge Extracted from the Web, Proceedings of the KDD-2000 Workshop on Text Mining, pages 29–36, Boston, Mass., August, 2000 (the disclosure of which is hereby incorporated by reference), the authors extract information about corporations across the world from resources on the web. Then data mining is performed on the created knowledge base. The authors claim that the results indicate that there is indeed promise in automatically learning new things from the web. In the paper A. McCallum, K. Nigam, J. Renie, and K. Seymore, Building Domain-Specific Search Engines with Machine Learning Techniques, AAAI-99 Spring Symposium on Intelligent Agents in Cyberspace (1999), the authors describe the Ra Project, which uses machine learning methods in an effort to create and automate domain-specific search engines. The paper presents efficient spidering via reinforcement learning, extracting topic relevant sub-strings, and building a topic hierarchy. The techniques of wrapper induction as disclosed in N. Kushmerick, D. Weld, and R. Doorenbos, Wrapper Induction for Information Extraction, In Proc. Of the $15^{th}$ International Conference on Artificial Intelligence, pp 729–735, 1997 utilize learning algorithms that are capable of extracting prepositional knowledge from highly structured automatically generated web pages.

The art does not disclose the automatic extraction of multidimensional application specific information from a library of information source documents, such as, the automatic extraction of event information from Web documents.

From a commercial perspective, multiple event- and calendar-oriented web-sites and services have been developed in response to the need for event tracking software, but they lack automatic scheduled-event compilation. For example, an event Web site called when.com was recently purchased by America Online to provide personalized event directories and calendar services for users. However, when.com's approach suffers from the manual compilation limitations discussed above. Other search engines for monitoring events are also available on the Web, some of which are listed below in Table 1. They also have limitations similar to when.com.

TABLE 1

Partial list of websites for obtaining scheduled-event information

| Web Sites | Main features | Limitations |
| --- | --- | --- |
| www.when.com | Directory of select event categories (sports, book and movie releases, etc.) Personalized calendar with capability of adding and tracking specific events | Manually created event directory No time and place query for searching events. |
| www.palm.net (Event Club) | Time and place query search for US and select international cities. | Manually created event directory No time and place query for searching events. |
| www.whatsgoingon.com | Time, place and event query search for select events in US and select international cities | Manually created event directory No calendar features |
| www.event.net | Directory of select event categories Mainly for organizing and planning events (such as parties, movie, etc.) | Manually created event directory No time and place based query search. |
| www.expoworld.net | Meta-site and search engine linking event related Search Tools Mainly for events and international trade communities worldwide | Manually created directory and links Only for trade shows More suitable for planning events |

There have been several notable efforts in eliciting information from, e.g., highly structured web-documents. In Doorenbos, R., Etzioni, O., Weld, D. S., A Scalable Comparison-Shopping Agent for the World Wide Web, in Proc. of the First International Conference on Autonomous Agents, 1997 (the disclosure of which is hereby incorporated by reference), the authors investigate the effectiveness of intelligent information extraction agents via a case study called ShopBot. As reported, ShopBot is a fully implemented, domain-independent comparison-shopping agent. The agent automatically learns how to shop at different E-commerce sites and then garners product information in an effort to assist the user with a survey of the product price across shops. In M. Craven, D. Dipasquo, D. Freitag, A. McCallum, T. Mitchell, K. Nigam, S. Slattery, Learning to Extract Symbolic Knowledge from the World Wide Web, Proceedings of the $15^{th}$ National Conference on Artificial Intelligence (AAAI-98) (the disclosure of which is hereby incorporated by reference), the authors report the development of a trainable information extraction system that takes two inputs: an ontology defining the classes and relations of interest, and a set of training data The training data consists of tagged segments of hypertext that represent instances of the selected classes and relations. Once the system is trained, the system can extract information from other pages on the web. The authors report the use of a modified naïve Bayes approach to classifying web pages into different pre-established classes. In D. Freitag, Information Extraction from HTML: Application of a General Machine Learning Approach, in Proceedings of the 15th National Conference on Artificial Intelligence, pages 517–523, 1998 (the disclosure of which is hereby incorporated by reference), the authors report the use of SRV, a relational learning system that automatically learns to extract rules from a domain consisting of university courses and research pages from the Web. Kushmerick, D. Weld, and R. Doorenbos, Wrapper Induction for Information Extraction, in Proc. of the $15^{th}$ International Conference on Artificial Intelligence, pp 729–735, 1997 (the disclosure of which is hereby incorporated by reference), discuss wrapper induction methods for information retrieval. In their reported approach, they use wrappers to effectively extract information from web-pages that are generated based on HTML. The wrapper induction based systems generate delimiter-based rules and do not use linguistic constraints. Other examples of agents capable of automatically extracting information from the Web include WHISK as reported in S. Soderland, Leaning Information Extraction Rules for Semi-Structured and Free Text. Machine Learning, 34, 233–272, 1999, RAPIER, as reported in M. Califf and R. Mooney, Relational Learning of Pattern-Match Rules for Information Extraction, Working Papers of the ACL-97 Workshop in Natural Language Learning, pp 9–15, 1997], CRYSTAL, as reported in S. Soderland, D. Fisher, J. Aseltine, W. Lehnert, CRYSTAL: Inducing a Conceptual Dictionary, Proc. of the $14^{th}$ International Joint Conference on Artificial Intelligence, pp 1314–1319, 1995, and Webfoot, as reported in S. Soderland, Learning to Extract Text-Based Information from the World Wide Web, in Proceedings of the Third International Conference of Knowledge Discovery and Data Mining, KDD-1997 (the disclosures of each of which is hereby incorporated by reference). In Doorenbos, R., Etzioni, O., Weld, D. S., A Scalable Comparison-Shopping Agent for the World Wide Web, in Proc. of the First International Conference on Autonomous Agents, 1997 (the disclosure of which is hereby incorporated by reference), the authors claim that most of the learning agents that are in vogue seem to concentrate on learning more about the user's interests than trying to learn about the resources they access. The present invention involves understanding the Web documents to elicit event information in the context of user interests which are specified explicitly by the user.

Inductive learning techniques are also well known in the art, such as CN2, discussed in P. Clark, and T. Niblett, The CN2 Induction Algorithm, Machine Learning, 3(4), pp 261–263, 1989; SRV, discussed in D. Freitag, Information Extraction from HTML: Application of a General Machine Learning Approach, in Proceedings of the 15th National Conference on Artificial Intelligence, pages 517–523, 1998; C5, discussed in J. R. Quinlan, C4.5: Programs for Machine Learning, Morgan Kaufmann, Los Altos, Calif., 1992; and FOIL, discussed in J. R. Quinlan, and R. M. Cameron-Jones, FOIL: A Midterm Report, in Proc. of the $12^{th}$ European Conference on Machine Learning, 1993 (the disclosures of which are hereby incorporated by reference).

SUMMARY OF THE INVENTION

An apparatus and method is disclosed for providing application specific multi-dimensional information to an application running on a user computing device, wherein at least one dimension of the information is a category, from a plurality of member documents electronically extracted from a library of electronically searchable documents, which may comprise an application specific multidimensional information extractor adapted to extract occurrences of prospective representations of dimensions of application specific multidimensional information from the member documents, and to extract occurrences of non-application specific multidimensional information from the member documents; and, an encoder adapted to encode the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element. The apparatus and method may further comprise a member document identifier adapted to determine whether a member document contains coded formatting, and if not, whether the member document is a dense document, and if not, for rejecting the document from further processing, and the coded formatting may comprise network markup language coding.

The apparatus and method may further comprise an application specific multidimensional information verification unit adapted verify the extraction of application specific multi-dimensional information from the member documents, and may further comprise a database for storing the application specific multi-dimensional information adapted to provide an application running on a user computing device access to the application specific multidimensional information. The application specific multidimensional information may be scheduled events having the dimensions of time, location and event identity, and the application running on the user computer can be an electronic calendar or other similar scheduling software program

BRIEF DESCRIPTION OF THE DRAWINGS

FIG. 5 shows a partial printout of some key words extracted, e.g., using a web crawler, e.g., for generating an E-Space useful in the present invention;

FIG. 6 shows an example of a constructed term-document matrix as part of a construction of an E-Space useful in the present invention;

FIG. 8 shows some examples of singular vectors corresponding to an E-Space useful in carrying out the present invention;

FIGS. 11(*a*), (*b*) and (*c*) show an example of EML encoding from extracted words to an intra-level representation, e.g., for a golf event, useful in carrying out the present invention;

FIG. 12(*a*) show a representation of inter-level work co-occurrence models, e.g., for a golf event search, useful in carrying out the present invention;

FIG. 12(*b*) shows a representation of EML encoding using the inter-level word co-occurrence models useful in implementing the present invention;

DETAILED DESCRIPTION OF THE PREFERRED EMBODIMENTS

Figure 1:
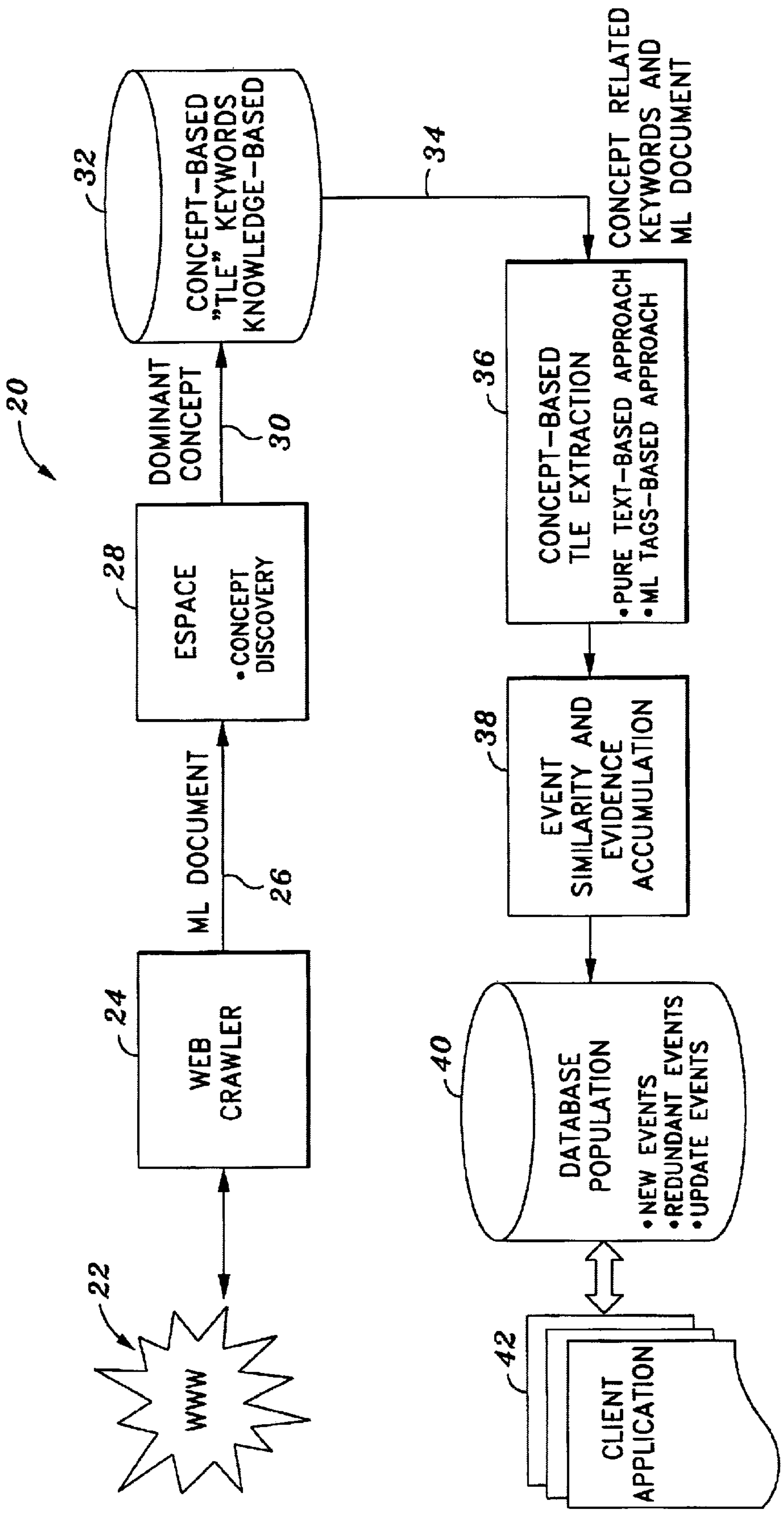
FIG. 1 shows a schematic block diagram of a system according to the present invention.

The present invention will be described in the context of a particular embodiment that is useful for automatically finding application specific multidimensional data from a source of information containing documents. The particular case described is the automatic updating of a database to which is automatically or selectively attached an electronic calendar application running on a user computing device, such that the user's electronic calendar can be updated with the listing of events scheduled in the future of a selected interest to the user. The multidimensional information/data in this example can be the time, place and event. The event can be, for example, a concert of a particular musical group or of a particular genre of music, golf tournaments, etc. In the specific embodiment herein disclosed this is exemplified by a golf event.

A scheduled event (E) can be defined as an entity that occurs at a particular time (T) in a particular location (L) and is a member of a category (C). Given this definition and a particular category of interest (concerts of a particular group, concerts of a particular genre, golf tournaments, etc.) a purpose of the present invention includes automatically finding relevant documents from a library of searchable documents. In the specific case described the library is formed by web-pages on websites accessible over the web as is well known. It will be understood, that the present invention is not so limited, and a vide variety of possible collections of electronically searchable documents can be the content of the library searched according to the present invention. These can include a wide variety of public and private collections of electronically searchable documents accessible over the Internet and/or any of its subsets of networked computers, including intranets and extranets, LANs, WANs, etc. These include, by way of example, public, university and company libraries of books, periodically, journals, and other less formalized document collections containing, e.g., internal technical/business information accessible on line, including only limited access, e.g., inside of a fire-wall surrounding a company's confidential information. The library can include these other types of searchable documents, exclusive of web-sites and web-pages, or some combination thereof.

In the exemplary model described herein, the Web contains web-sites and/or particular web-pages within a web-site, that contain electronically searchable information relating to wide varieties of types of events and specific events from within such types of events, it being understood that the type or category may be selectively defined by a user, as explained in more detail below. The present invention can extract the relevant "TLE" information from any particular electronically searchable document, e.g., a web-page and store the TLE data in a dynamically updated database for use by various user applications, such as an electronic calendar. An overview of a manner of operation of the present invention for, e.g., scheduled event detection and extraction is summarized in relation to FIG. 1.

Initially, the present invention can mine documents from the Web 22, based on an event category of interest to the user, or a given set of event categories of interest to the user (such as golf events or concert events). Of assistance in making the search efficient can be the use of an electronic search agent, e.g., a web crawler 24, which can be initialized, e.g., with web-sites that are relevant to a given category. For example, the web-site www.pgatour.com is a relevant site for finding golf events. Web crawlers/agents/spiders/robots as is well known can comprise computer programs that are able to automatically perform searches for information on the Web without any manual intervention. These programs can be goal-directed processes that react (with some intelligence) to a variety of factors in the Web environment. They are flexible and are usually created as objects that can run in parallel using what is referred to as multi-threading. Several agents may be instantiated in parallel, with each such agent, e.g., seeded with a set of web-sites. These "seed" web-sites ray initially be obtained, e.g., by using a search engine, such as, Google and based on category-specific keywords. For example, for golf events, one could use the keyword "golf" to search for web-sites. Other search engines could also be used to obtain the seed web-sites.

Processing accuracy and speed can be achieved according to the present invention through the use of a filter 28, denominated herein as "E-Space" 28 for each category. An individual E-Space 28 for each individual category can be built from representative sets of event relevant documents mined from the Web 22 by the Web crawler. Latent Semantic Indexing (LSI), as described in U.S. Pat. No. 4,839,853, entitled COMPUTER INFORMATION RETRIEVAL USING LATENT SEMANTIC STRUCTURE, issued to Deerwester, et al. on Jun. 13, 1989 (the disclosure of which is hereby incorporated by reference), can be used to extract a category specific representation of a relevant document, e.g., a concept 30, defining a sub-space that forms a compact representation for the set of relevant documents for a given event category, i.e., "E-Space" filter 28 (i.e., an "Essential Keyword Space," or in the case of the specific example discussed herein an "Event Space"). This sub-space 30 represents the essence of the "concept" behind any given event category (such as "golf" or "music"). Another useful feature of the automatic creation of E-Space filter 28 is that essential keywords for a category can be automatically extracted as a by-product. For a given document (mined by the web-crawler 24), the E-Space 28 filter can be used to determine if the document belongs to any of a set of relevant category-specific learned concept sub-spaces, i.e., is a member document or not. If the document is identified as a member of a respective one of the learned concept sub-spaces 30, then a corresponding set of event keywords can be extracted from that particular document in block 36. All non-member documents can be rejected with only the member documents passing on 34 to the concept-based TLE extraction unit 36. E-Space 28 filter can then be viewed as a filter that facilitates the processing of only relevant application specific multidimensional information documents, e.g., event documents.

Event keywords corresponding to an accepted (learned) concept 30 can be selected from relevant documents that are determined to be in the sub-space 30 in module 32. These keywords can then be input at 34, along with the member documents, into a core processing module, i.e., the concept-based TLE extraction module 36, which can be responsible for both event detection and event extraction.

Figure 2:
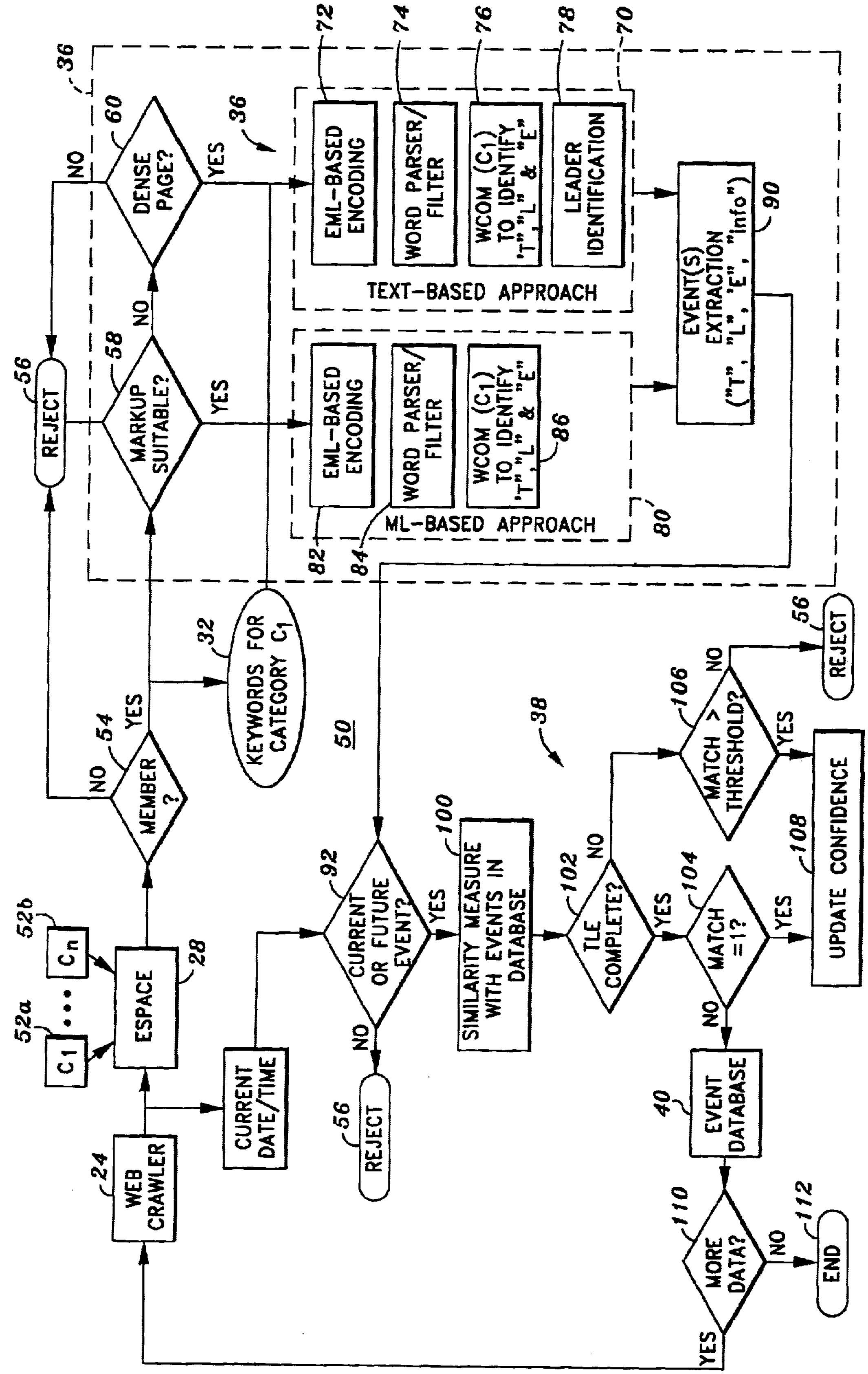
FIG. 2 shows a flow diagram of an embodiment of the present invention.

Turning now to FIG. 2 there is shown a flow diagram of an embodiment of the present invention. The web crawler 24 produces documents that are category relevant, based upon seeding of e.g., a particularly pertinent web-site or web-sites, or simply key words utilized by the web-crawler 22 as a search agent for searching for documents that match the search criterion input into the web crawler 22. Each document selected by the web crawler 22 can be classified as a dense or sparse event page, depending, e.g., on the density of time and location information found in the page. For example, if the page contains many occurrences of terms such as days of the week, i.e., "Sunday", "Monday" etc., as well as terms relating, e.g., to location, e.g., "Omaha", "CA" etc., then the page can be classified as a dense page in block 60. Dense pages normally contain event information in tabular form. The detection of events can be primarily based on the co-occurrence patterns of the "T," "L" and "E" multidimensional data components identified within the text of dense event page(s) in block 70. By taking advantage of cues available in the form of tags in some of the existing markup languages such as HTML and XML, the presence of which may be determined in block 58, the present invention can process both sparse and dense event pages by using these tags to extract event information in block 80.

In order to identify the primary "T", "L" and "E" components either the entire text or simply the text between HTML/XML tags of a document can be encoded using a special markup language ("Essential Dimension Markup Language" or in the specific embodiment disclosed herein, "Event Markup Language," i.e., "EML") in module 36 shown in FIGS. 1 and 2, as described in more detail below. As an example, if the page contains "TLE" patterns in close proximity (e.g., within a few words of each other) then each such sequence can be marked as a potential event description. These potential event descriptions can then stored in a temporary buffer in block 100 in FIG. 2, within the event similarity and evidence accumulation module 38 of FIG. 1, until the accuracy of the "TLE" content can be verified in module 38, e.g., through the comparison of potential event descriptors obtained from documents from several sources (such as the same golf event extracted from multiple web-sites). This process can be viewed as an evidence accumulation process. Only those event descriptors with sufficient evidence to verify the accuracy of their "TLE" descriptions are finally accepted as valid events and inserted into the database 40 by module 38. This process can enable the minimization of the risk of false or inaccurate event information populating the event database 40.

If the source document, e.g., a web-page has a distinctive markup such as a table of events, then markup based processing initiated in block 58 of FIG. 2 can be used to recognize this feature and then lead to processing that can directly extract the "TLE" content from the cells of the table in block 80 shown in FIG. 2. The extracted TLE components can then used to populate the dynamic event database 40, after verification in module 38, as just described and as described in more detail below.

The dynamic event database 40 can be one of a variety of well known relational databases or the like, providing access to applications running on a user computing device, not shown. The dynamic event database 40, can be organized, e.g., along the lines of the dimensions of the application specific multidimensional information, e.g., in the example herein, location, time, and category dimensions, and can then be used to provide a variety of client services such as event calendars, schedule planning etc. These can be provided upon user request or automatically pushed into the user applications, as is well known Turning now to FIG. 3, there is shown a schematic block diagram of a web crawler architecture useful with the present invention. Each category agent **120*a* . . . 120*n*, 122*a* . . . 122*n*, can be provided with links 122 corresponding to the top 5% of the web-sites uncovered using, e.g., search results from a search engine, e.g., the Google search engine, for a given category, i.e., a Google category specific key word search. For each link, the agent 120*a* . . . 120*n* can be programmed to extract all of its anchor tags. For each link 122 referred to by the anchor, the crawler can search for event information, using the text or other special tags (such as the <table>tag for HIML documents) found in the page. That page can then be passed to the E-Space module 28 to discover a concept contained in the page. If the page, e.g., identified by a URL, contains one of the required category specific concepts, as determined in module 28**, then the URL along with the location can be stored in a buffer and the crawling can proceed to all links found within the anchor tags of that link page. This can enable the crawler to keep track of location information if subsequent pages do not have them. According to the present invention one can specifically program the crawler to only search for HTML or XML content. If the URL for a page does not belong to one of the pre-selected categories, then that thread can be released to crawl other sites thereby improving the crawling efficiency.

Figure 3:
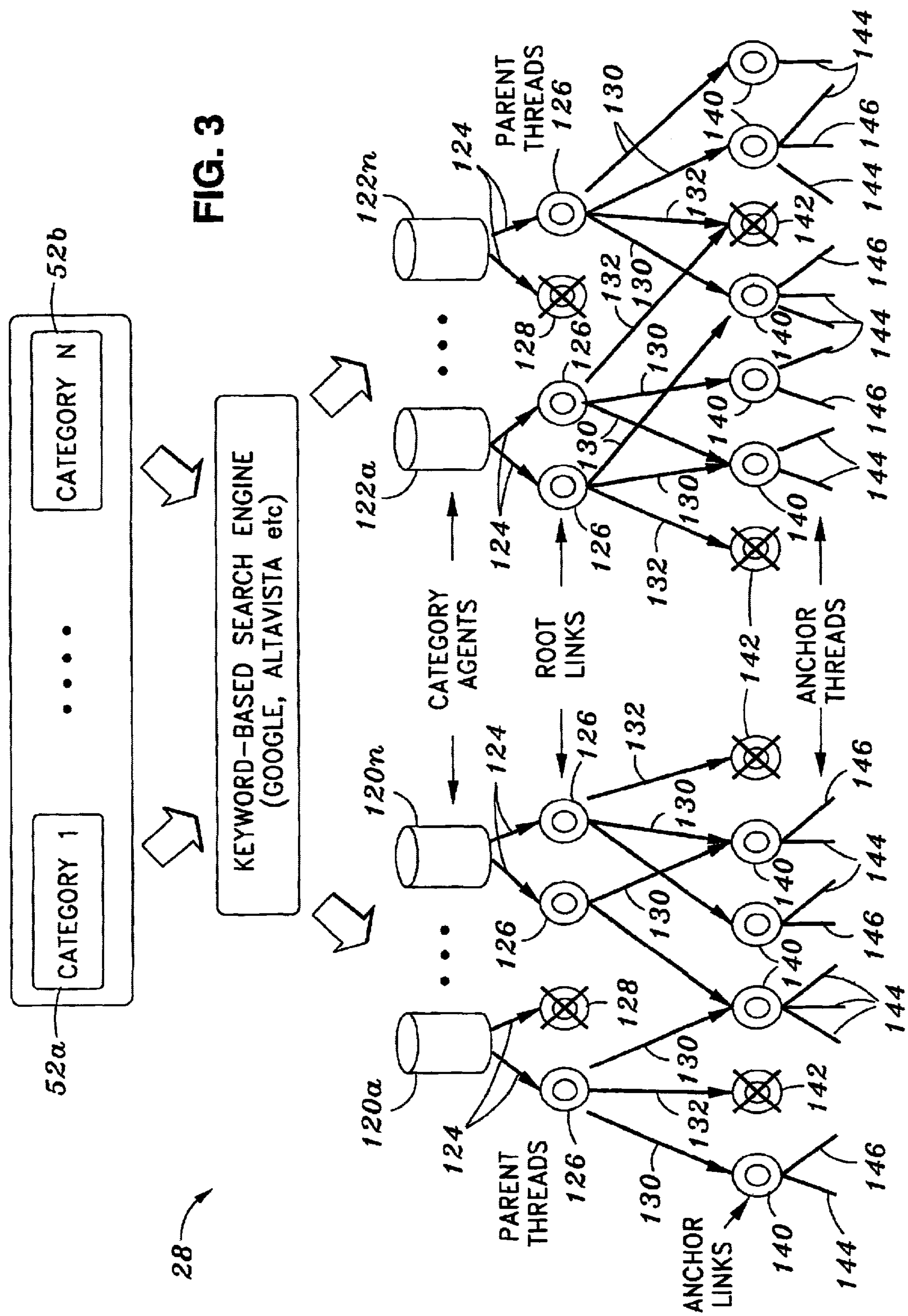
FIG. 3 shows a schematic block diagram of a web-crawler architecture useful with the present invention.

Web crawling for various categories according to the present invention, can take place in parallel with each category being initialized with multiple crawling agents called category agents **120*a* . . . 120*n*, 122*a* . . . 122*n*, as shown in FIG. 3. Each category agent can in turn be provided with several seed web-sites called root links 126, 128, e.g., using the keyword based search engine (as discussed above). The crawling process adopted by each category agent can be based on a breadth-first search. Every root link can be allocated a single thread. These threads can be parent threads 124 or root threads 130, 132. The links found within the anchor tags of sites corresponding to the parent threads 124 are termed the anchor links 140, 142. Each anchor link 140, 142, can be added to the list of active threads or enqueued using a separate thread called the anchor threads 144, 146. The search process can be propagated through these anchor threads if the information found in the corresponding links or its text satisfies the conditions as discussed above. If the conditions are satisfied, then the text from the corresponding link can be input to the E-Space module 28 for further processing. The propagation also can continue further along the links found in that page. In FIG. 3, the anchor threads 144, 146 that satisfy the conditions are labeled 144 while the others are labeled 146. If an anchor link is dead (i.e., there is no response from the site), indicated by numerals 142, then the corresponding thread 132 can be released to assist other category agents 120*a* . . . 120*n*, 122*a* . . . 122*n*, or the other threads 130 of the same category agent 120*a* . . . 120*n*, or 122*a* . . . 122*n*. If an anchor link 140 does not satisfy the conditions, then the corresponding anchor thread 144, 146 can be released and the anchor link 140 can be removed from the list of sites to be listed by active threads 130. When a thread 130 becomes idle, it can be re-allocated to another link 140. All the agents 120***a* . . . 120*n*, 122*a* . . . 122*n*, can terminate processing when no further web-sites can be found to satisfy the search conditions for any thread.

The candidate or relevant web-pages returned by the web crawler 24 can be verified to be members of the event category being sought. This can be done using Event Space (E-Space) filter in module 28. An E-Space can be created utilizing a modification of Latent Semantic Indexing (LSI). The dimensions in LSI can correspond to various combinations of terms used in a document. These dimensions are variously known in the art as components, tokens or dimensions of category specific information. LSI was originally developed for text searching and document retrieval applications. By looking across many documents in a given category, a category specific representation of a relevant candidate document, i.e., a "concept" representing a category, can be extracted. A "concept" in LSI can be represented by particular combinations of terms that occur frequently for a given category. These combinations can be represented by a set of directions in term space. The set of all relevant documents in a category can populate a subspace that is spanned by these directions. The subspace can be found using a mathematical operation called singular-value decomposition (SVD). SVD can also provide a projection operator that can find the members of the subspace that are closest to the candidate document. Documents that are not members of the category tend to not have the proper combinations of terms and are therefore projected close to the origin of the subspace. Category members are projected further away from the origin, which facilitates their detection. LSI according to the present invention can be utilized for forming an E-Space that can be used to determine whether a source document, e.g., a web-page returned by the web crawler, is a member of the desired application specific multidimensional information category, e.g., a scheduled-event category. Such an E-Space filter can be used to define a subspace which represents, e.g., a given scheduled-event category such as, for example, golf tournaments.

Figure 4:
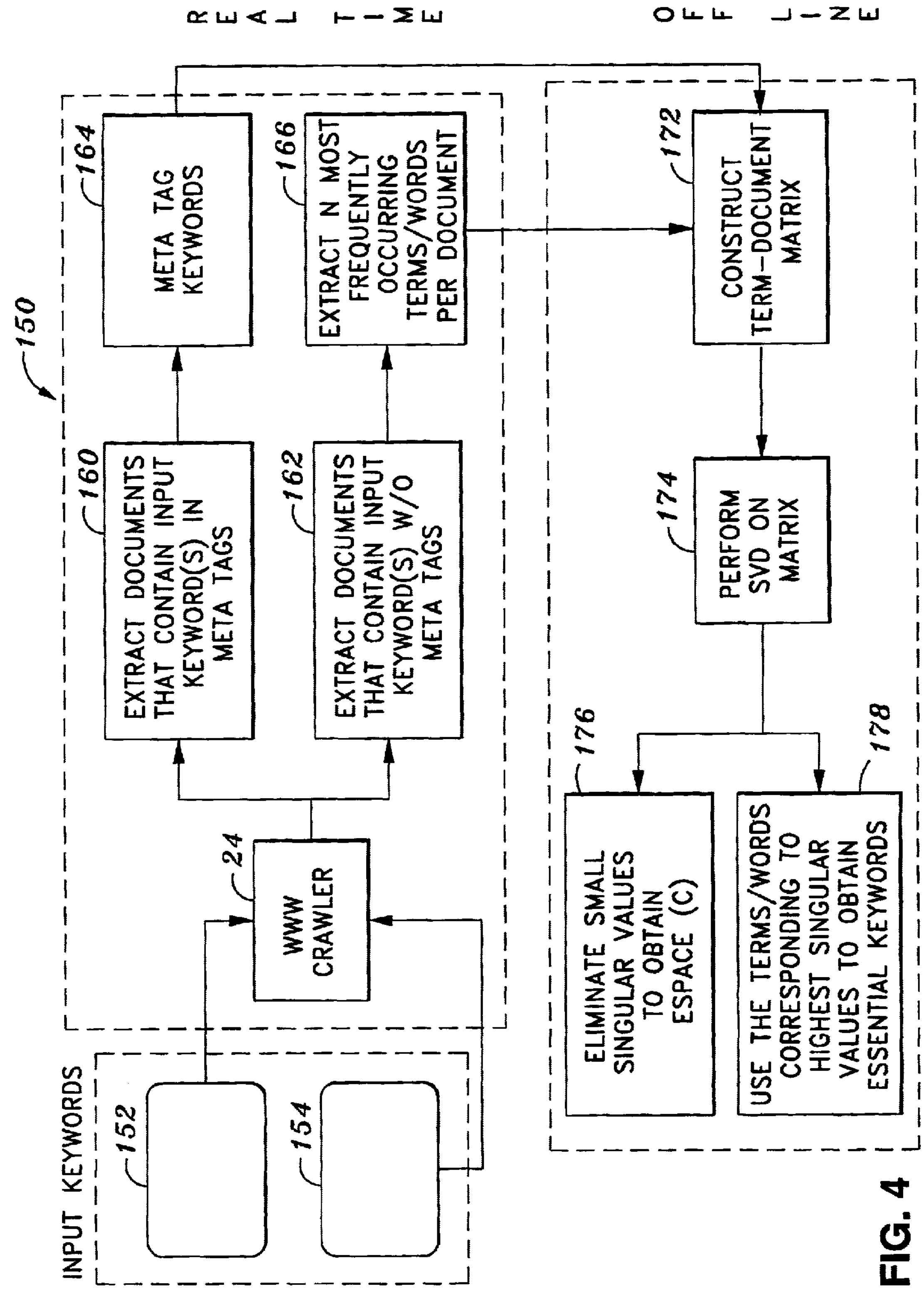
FIG. 4 shows a flow chart for the construction of an E-Space for searching according to the present invention.

The construction of an E-Space filter for a given category can be shown in more detail in reference to FIG. 4. As described above, the web crawler 24 can return multiple web-pages using, e.g., conventional keyword searches. Web-pages often contain Meta tags that can be used for such purposes as formatting and providing information for search engines, which can be identified in block 160. Terms consisting of keywords in the Meta tags can be extracted in block 164 from the document. Other documents that contain input keywords without meta tags, uncovered by the web crawler 24, are extracted in block 162. After removing "junk" words such as "a" or "the", additional terms can be extracted from the body of the web page, e.g., the N most frequently occurring terms/words in each given document can be extracted in block 166. The relative frequencies of terms can be used to form the E-Space.

In block 172, the system can construct a term-document matrix, upon which can be performed and analysis, e.g., SVD in block 174 in order to create the E-Space filter in block 176 and provide learned keywords to the system for the purpose of assisting in the extraction of application specific information, as explained in more detail below.

Examples of terms 200 extracted from a set of golf pages are shown in FIG. 5. A term-document matrix 210, shown in FIG. 6, can then constructed in block 172 of FIG. 4, using this union of terms 200 collected from a set of exemplary web-pages for the category of interest. As shown in FIG. 6, for the golf event example, each row 212 of the matrix 210 can represent a term 216, while each column 214 can represent a particular document. Each entry 218 in the matrix can be used to represent how many times that term 216 occurs in that document 214. The set of terms 216 at this point can be fairly broad and contain many terms that are not golf-specialized. The number of unique terms 216 can be quite large, typically in the hundreds. If each term 216 is considered to be a term dimension, then each column 214 of the tem-document matrix can represent a vector in a high-dimensional space that represents a particular document 214. Utilizing a created E-Space documents in a given category that consistently occupy a subspace of a high-dimensional term space can be identified as member documents, while non-member documents which have a low probability of occupying the subspace can also be identified.

SVD is a well-known mathematical technique for finding the subspace spanned by a matrix. LSI can utilize SVD to find the term subspace spanned by the documents in the term-document matrix. Given a term-document matrix A for a given category, SVD can be used to express A as the product of three matrices:

$$A=UWV^T$$

where the columns of U are called the left singular vectors, the columns of V are the right singular vectors, and W is a diagonal matrix whose diagonal elements are the singular values in order of decreasing magnitude. The left singular vectors span the term space. The magnitude of a singular value is a measure of the "importance" of the corresponding singular vector. An approximation to A can be made by zeroing out singular values below a given threshold level. The subset of left singular vectors that correspond to the remaining nonzero singular values then spans the subspace represented by A. In practice, only a few left singular vectors that result in a large compression of the matrix can often represent term-document matrices. The subspace spanned by the subset of singular vectors then represents the "concept" of the category. The set of keywords within this subset can also be used to represent the vocabulary used to describe the concept. SVD also can define a projection operator that, for a given "query" document vector, finds the document vector in the subspace that is closest to the query vector. Query vectors that are not members of the category tend to project to subspace vectors that are close to the origin. For a query vector $A_q$, the projection is given by $$A_p=W^{1/2}U^TA_q$$

Figure 7:
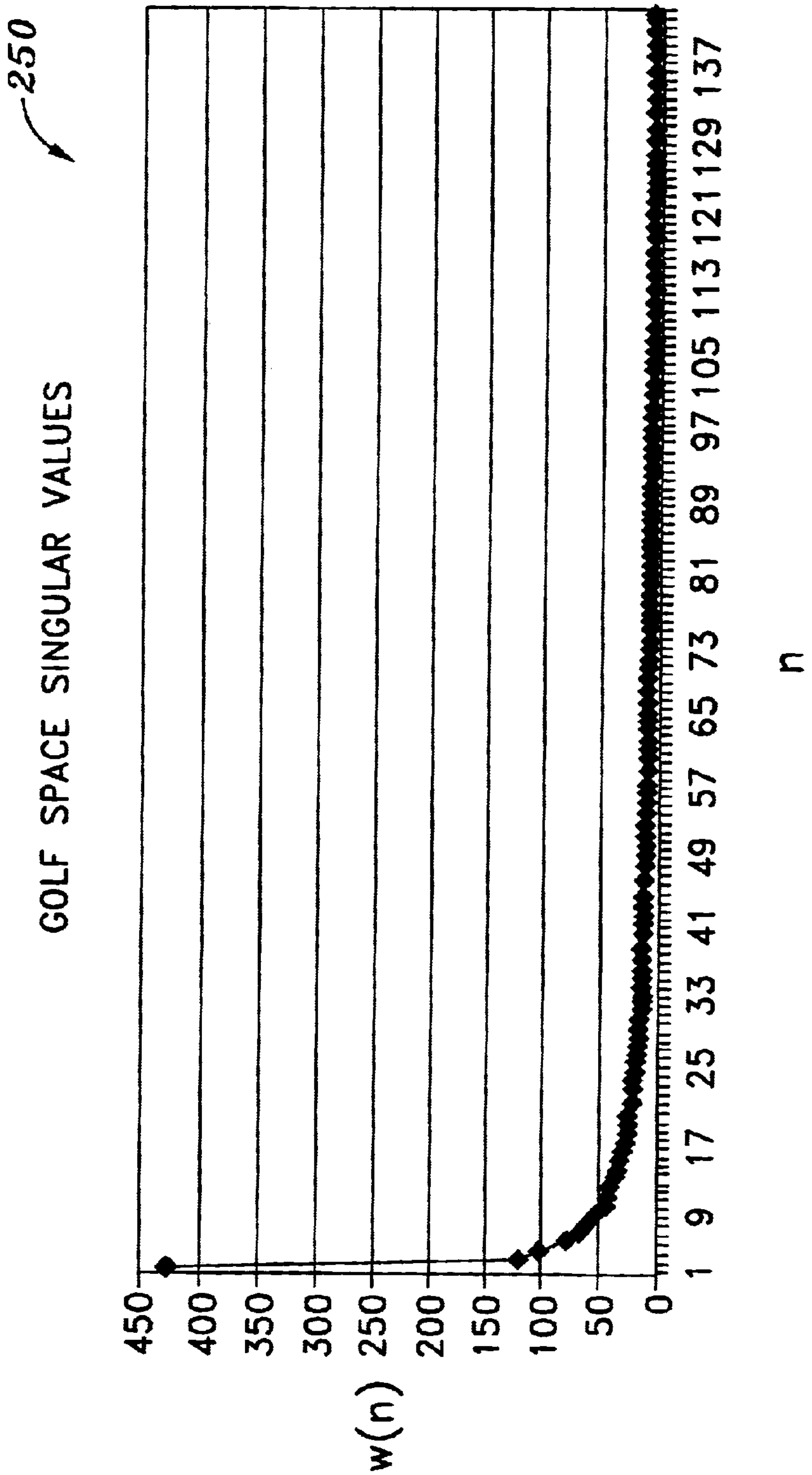
FIG. 7 shows and example of a plot of singular values from the most dominant to the least dominant vectors utilized in creating an E-Space according to the present invention.

A modified LSI, according to the present invention, can form scheduled-event subspaces where the documents are replaced by "root link" web-pages for a particular category and the terms can be extracted from both the meta tags and the body text. As discussed above, the root link pages can be obtained using conventional search engines. The singular values, which can be calculated for the golf example, are shown in chart 250 in FIG. 7. It will be noted that only a small subset has a relatively large value. Left singular vectors with large singular values can be considered more "significant" and to represent relevant descriptors of the concept described by the subspace, i.e., the category being searched. In FIG. 8 is shown a comparison of the three most "significant" singular vectors U1, U2 and U3 for the golf-event concept along with the least significant vector U143. The lists of terms 266, 270, 280 and 284 in each vector U1, U2, U3 and U143 can be sorted in decreasing order of the magnitude of the vector value for each term. Therefore the most important terms for each singular vector usually are in the first few rows 290. It will be noted that the first few terms in the rows 290 for the most significant singular vectors U1, U3 and U3 are obviously relevant for defining a golf-event concept. They are terms such as tour, PGA, golf, Open, Woods, etc. These significant terms can also be used to locate events within a Web page using Event Markup Language techniques, as will be described below. The first few terms in the rows 290 for the least significant vector U143 are terms such as amp, bowling, Glasson, etc. which are significantly less relevant or unique to golf. This subspace or golf "concept" was learned automatically from training embodying the output of the category specific data seeded web-crawler 24.

Figure 9:
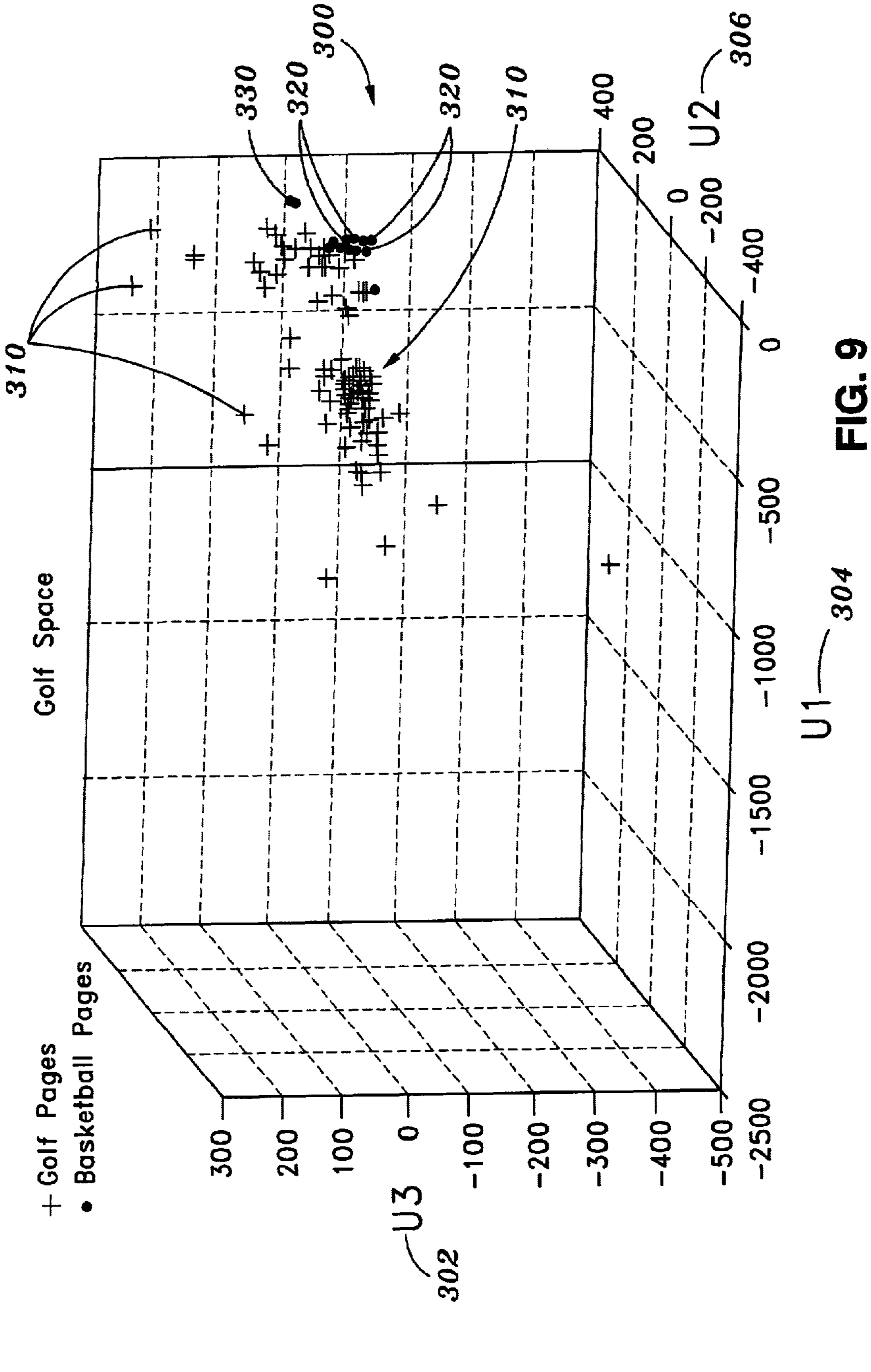
FIG. 9 shows a graphical representation of the separation of information pages of different category types, e.g., golf and basketball pages utilizing an E-Space searching technique useful in the present invention.

This subspace can now be used to identify documents, e.g., web-pages that belong to the golf-event concept by using, e.g., a projection operator as described above. In FIG. 9 is plotted the results of projecting test sets of golf and basketball web-pages into the first three dimensions of the golf-event subspace constructed using a training set of about 100 golf event web-pages. The training and test sets were obtained using conventional search engines to find root link pages, as described above. The two sets were disjoint, i.e., no web-pages were in both the training and test sets. By way of example, only three dimensions are used in order to be able to plot the results, but in practice a higher number could be used for increased accuracy. Golf and basketball web-pages were chosen because they are related but distinct subjects. The basketball pages 320, which are plotted as dots, clearly cluster close to the origin (0,0,0) 330 while the golf pages 310, which are plotted as crosses, generally further out from the origin 330, allowing easy separation and classification between the two category pages. In practice a larger number of dimensions and statistical classification algorithms could be used to form a set of decision surfaces for automatically classifying a test page as a member or non-member of a particular event category.

A variety of methods can be used to decide whether a test page is a member of a particular category. Perhaps the simplest method is the one described above, i.e., to measure the distance of the test page from the origin of the event subspace and compare it to a threshold value. If the distance exceeds the threshold, the page could be considered to be a member. The threshold value can be determined based on the probability distributions of the distance values for members and non-members. This distance method, assuming three dimensions of the information space, e.g., can implement a spherical decision surface in the event subspace that is centered on the origin and has a radius equal to the threshold value. Member and nonmember pages project to points outside and inside the sphere, respectively. While this method works and has the virtue of simplicity, it may not take into account the shape of the member probability distribution in the event subspace. More accurate page classification can be obtained by tailoring the shape of the decision surface to the probability distribution of the member class. A number of statistical classification algorithms can be used to create such nonlinear decision surfaces. The algorithms can "learn" the surfaces from a training set which contains examples of both members and nonmembers of the category, e.g. event class. Examples of these classification algorithms, which are well-known in the pattern-recognition field, include backpropagation neural networks, radial basis function neural networks, learning vector quantization, gaussian mixture decomposition, decision trees, etc. These methods can be used to implement arbitrary decision surfaces, which match the shapes of member classes in the category, e.g., event space with perhaps more accurately than is possible using simple spheres, hyper-spheres or hyperplanes.

Therefore, in addition to the E-Space filter being constrained to select relevant documents from, e.g., the difference in distance from the origin of the category space, e.g., event space, these other forms of differentiation criteria can be employed, e.g., to select documents in more than one cluster or from one cluster that may also be relatively spaced from the origin of the space, but separate from the target category cluster. In such an embodiment, the leaning classification algorithm, as is well known, may be utilized to form a classification boundary other than the essentially spherical boundary that exists when distance from the origin in three dimensional space or multiple spheres in hyper space with multiple origins. This classification boundary may, e.g., form a waved plane spaced from the origin(s) a hyperbolic boundary space, etc. that is learned, e.g., from the placement of nodes in a neural network or learning tree method of providing, e.g., feedback learning (e.g., back propagation, to the process of defining from the content of the seed documents, e.g., the space in which there will most likely be relevant documents. Such a decision surface then can be utilized to discriminate between, e.g., relatively closely located clusters in the category space, by which side of the decision surface the particular cluster falls in the decision space.

Figure 10:
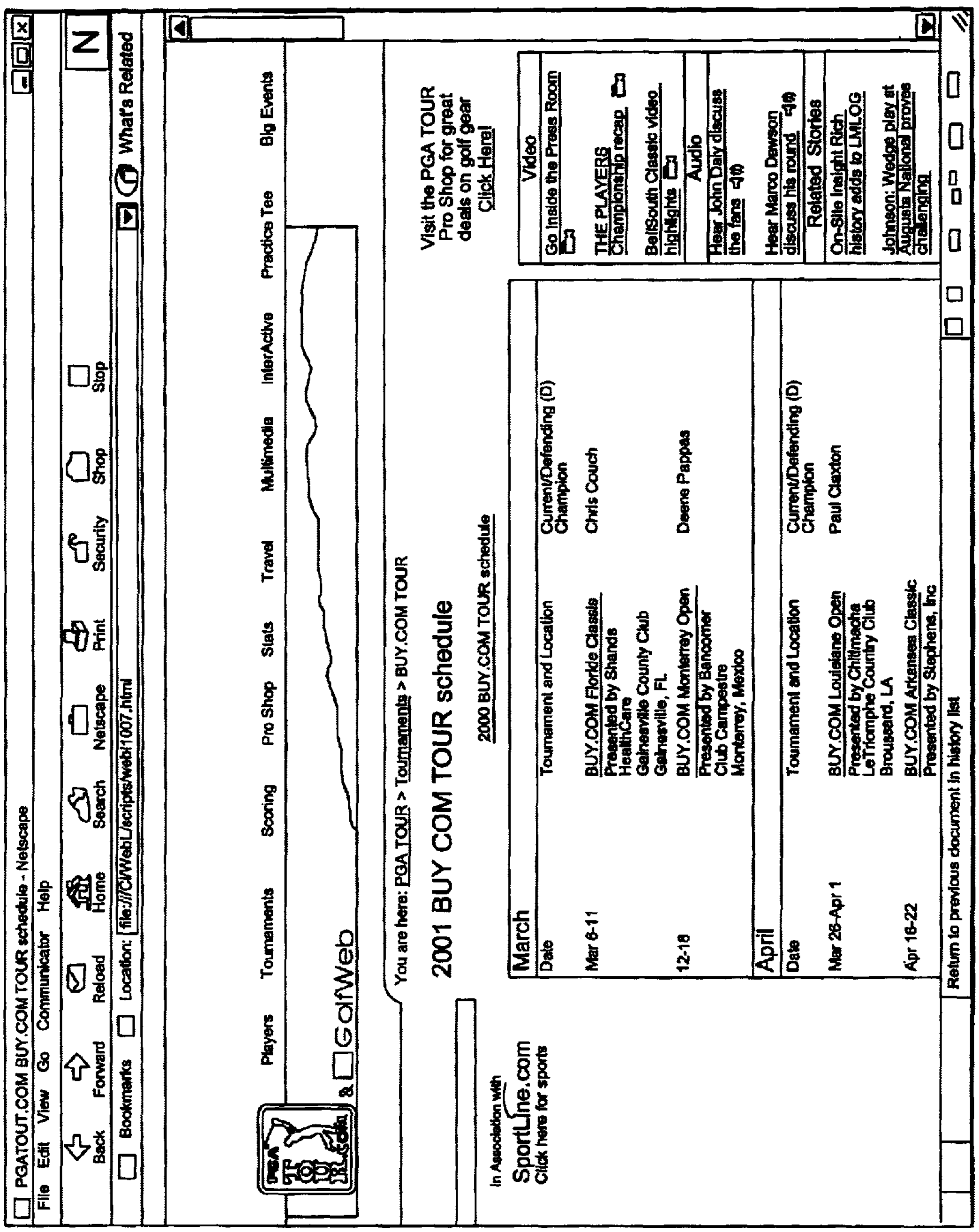
FIG. 10 shows an example of a dense information page of a particular category type, e.g., a dense golf event page mined according to the present invention.

The documents that pass the E-Space test in module 28 and block 54 are member documents that can be selected for event detection and event extraction in module 36. These documents can be processed first by density-based page classification in module 36 and block 60. The purpose of this block 60 is to measure the richness of event information present in a given document. The documents can be separated in block 60 into those that describe lots of events (dense page) and those that do not (sparse page). If a text contains several references to time and location, such as a relatively large number of month words and city or state words, then the document can be classified as a dense page and passed to block 70. In particular, documents can be classified as dense pages, e.g., if the total number of e.g., time and location words is, e.g., greater than a preset empirical threshold, e.g., 15 times within the document. Otherwise the page can be classified as a sparse page. If the text of a text page does not contain any specially marked tags, such as tables in HTML, as determined in block 58, and if the page is not classified as dense in block 60, then it is rejected. It will be understood that this determination of whether or not the page is markup suitable could occur either before the determination of whether the page is dense or not, as shown in FIG. 2, or after the latter determination of page density. However, this approach could readily be extended to process sparser pages, e.g., by relaxing the definition of the event model. An example of a dense "golf" event page extraction using a web crawler is shown, e.g., in FIG. 10.

Dense or structured documents that could potentially contain descriptions of the application specific multidimensional information, e.g., event information can be represented using an Event Markup Language or EML, in accordance with aspects of the present invention. EML language can be used to transform a document into a compressed form wherein the dominant features of the multidimensional information, e.g., event information, such as time, location and event category can be readily highlighted. EML can be used to essentially transform each document into a pattern of EML symbols, where components/dimensions/tokens of the application specific multidimensional information, e.g., event information, can emerge. An advantage of using EML can be that these patterns can be more amenable to analysis using pattern recognition techniques and to the automatic extraction of the multidimensional information, e.g., the definition of a specific event from a given document. Another potential advantage can lie in the ability to interact with services such as the HailStorm, as described in http://www.microsoft.com/net/hailstorm.asp (the disclosure of which is hereby incorporated by reference). According to this standard that Microsoft is promoting through its Windows XP operating system such services as myProfile, myLocation, myNotifications, myCalendar, myWallet, etc., which are user-centric rather than application- or device-centric, are examples of applications which cam be applications with which the present invention may interface. The present invention could make use of these services, e.g., via the XML type Event Markup Language to learn the user's interests, physical location, and schedule; alert the user of events and populate the user's calendar; and receive payment from the user.

Preliminarily to the EML encoding process being carried out in module 36, the content of each document can be parsed into words in blocks 72 or 82. If the document content is found to have a structure (such as an ML table, etc.), then the tags that represent these structures can be retained but the set of words between the tags can be parsed into separate words in block 82. On the other hand, if the text has no recognizable structure but is a dense page, then all tags can be stripped from the text and the raw text parsed into words in block 72. Since the present invention does not need to exploit any semantic information, words such as "the", "on," etc. can be filtered at this point and the filtered set of words can serve as inputs to the EML encoders in module 36.

Figures 11C, 12A, 12B:
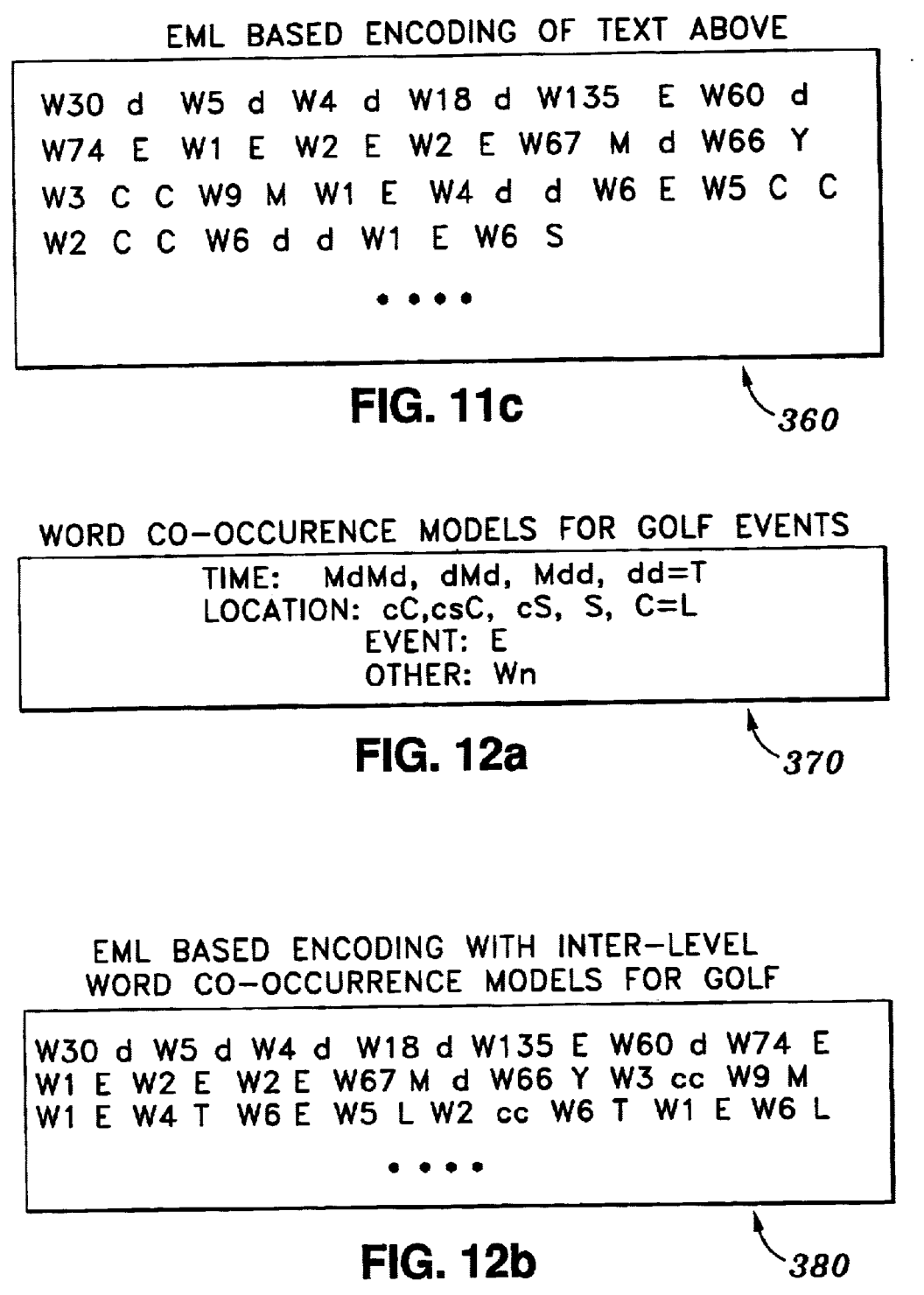

There are at least four basic types of event alphabet categories that may form the basis for EML as are shown by way of example in FIG. 11(*b*). The first type helps in the markup of time information in a document. All words corresponding to "year" information can be marked up using "Y". For example, any word, such as "2001," can be replaced by the symbol "Y" after EML encoding. Similarly, words that represent months, such as "January," can be replaced with the symbol "M". Any reference to days of the month, such as Sunday, can be replaced with the symbol "D." Numbers representative of an actual date, e.g., "22", can be replaced with the symbol "d". It will be understood that abbreviations of such terms as year dates, e.g., '01, month, e.g., Jan., and/or day, e.g., Sun, can also invoke the same replacements. Thus, if the document has a set of words that read ". . . Jan. 29 Feb. 3, 2001 . . . " then the corresponding EML encoded version could be ". . . M d M d Y . . . ". These EML encoded versions of a document can form the output of the blocks 74 and 84 in module 36. It will be understood that EML, Event Markup Language, is generic to the present invention and can stand for any category specific markup language specific to encoding of dimensions/components/tokens of any member documents in creating application specific multidimensional information and not only event information. Thus EML may be also considered as Essential dimension Markup Language for example.

A second type of information that can be encoded by EML may be the location information. This can require a database of e.g., keywords that represent various locations around the world with varying degrees of granularity, such as city, state, country etc. In the present invention, e.g., such a location database may be obtained by either constructing it manually or purchasing it from commercially available sources. Given the database, the EML can replace words that could potentially represent location information within the document as follows. First, all references to a country, such as "Australia," can be replaced with the symbol "C". This can be followed by replacing all references to a state, province, prefecture, etc., such as "California," "New south Wales," "Okinawa," etc. by a symbol such as "S". Finally, any reference to a city, such as "Los Angeles," can be replaced by a symbol such as "c". Thus, if the document has a set of words that read ". . . Sydney, Australia . . . ", then the corresponding EML encoded version will be ". . . c C . . . ". This form of encoding of a document could also form the output of the blocks 74 and 84 in module 36.

A third type of information that can be encoded by EML may be the event information. This information can vary depending on the type of category that is being processed. For example, if the category is "golf", then words such as "Championship" or "Open" typically are used in conjunction with golf events. To obtain this information, the present invention can rely on the E-Space module. In the above description of the E-Space, it was noted how the dominant keywords corresponding to each event category can be automatically obtained. For EML encoding of event information, the present invention can utilize this result of forming the E-Space, i.e., can select keywords from on this database of keywords. Each occurrence of an event keyword can be encoded using the letter "E".

Another type of information that can be encoded using EML comprises words that do not belong to any of the types of components/dimensions/tokens described above. In EML, a symbol such as "W" can be used to mark each such occurrence of a word that is not a part of or all of one of the dimensions of the multidimensional application specific information being sought. Contiguous words that belong to the "W" category can be encoded as "Wn" where "n" can represents the total number of such words. For example, the words ". . . Conejo Valley Championship . . . " can be encoded as ". . . W2 E.". The words "Conejo" and "Valley" can be encoded, e.g., as "W2". An example of a possible EML encoding for a golf event document is shown in FIG. 11. In this example, exemplary samples of words from part of a golf page are listed in 350 in FIG. 11(*a*). These words have been produced as the output of the word parser in blocks 72 or 82. The corresponding EML encoding is listed in the 360 in FIG. 11(*c*). It will be noted that there is a significant degree of compression in the content. It will also be noted that two events can be said to be represented in this compressed text content. These include "d d W6 E W5 c C" and "d d W1 E W6 S". The corresponding text in the EML encoded version is also shown.

The objective of text mining as utilized according to the present invention is to exploit information contained in textual documents including pattern discovery, trends in data, associations, prepositional rules, etc. A comprehensive compilation of the work that has been done in this area is given in M. Grobelnik, D. Mladenic, and N. Milic-Frayling, Text Mining as Integration of Several Related Research Areas: Report on KDD-2000 Workshop on Text Mining, Sixth ACM SIGKDD International Conference on Knowledge Discovery and Data Mining, Aug. 20–23, 2000, Boston, Mass., USA, the disclosure of which is hereby incorporated by reference. A comprehensive survey of some other examples of text mining approaches is presented in Ion Muslea. Extraction Patterns for Information Extraction Tasks: A Survey. In the AAAI Workshop, pag. 1–6, Orlando, Fla., 1999 (the disclosure of which is hereby incorporated by reference). Another example is the IBM Intelligent Miner, which can be found at http://www-4.ibm.com/software/data/iminer/fortext/index.html (the disclosure of which is hereby incorporated by reference), which discloses mining for text that harvests information from text sources such as customer correspondence, online news services, e-mail and Web pages. It has the ability to extract patterns from text, organize documents by subject, find predominant themes in a collection of documents, and search for relevant documents using powerful and flexible queries.

In the present invention textual content in each document can be translated using the EML encoding process as outlined above. While EML encoding can be used to highlight the "event-like" information within the document, it does not parse the document into specific events. This can require further processing on the basic EML encoded document to extract event information from it. There are at least two possible approaches to event detection and extraction from EML encoded documents. In a first instance event information can be extracted from EML encoded dense event page documents that do not have special tags to demarcate the text content. This can be referred to as the text-based approach, which can be carried out, e.g., in block 70 of FIG. 2.

A first step in the text-based approach can be to detect if an event is present in the EML encoded document. In order to perform event detection, one may use word co-occurrence models that can be derived from the EML encoded document. Event descriptions, especially in dense pages, can occur when the essential dimensional components of application specific multidimensional information, e.g., in the case of the event example, the time, location and event information, occur in the neighborhood of each other. As an example two levels of neighborhood properties can be sought for detecting the desired multidimensional information, e.g., event information. At a first level, which can be called the intra-level word co-occurrence level, different components of the same EML types can be expected to co-appear. In particular, e.g., time components, such as months and dates can be expected to first appear together. Similarly, location keywords, such as city and state can be expected to co-appear. At a next level, which can be called the inter-level word co-occurrence level, one can look for the co-occurrence of the various intra-level components.

Depending on the nature of application specific multidimensional information being sought, e.g., a particular dimension/component/token, i.e., event category in the event scheduling example, and the publishing style of the author of the source document, e.g., the web-page author, the intra-level co-occurrence patterns can vary. Some of these are shown by way of example in 370 in FIG. 12(*a*). For example, professional tour golf events typically last for several days. In looking for such golf events, therefore, one could expect intra-level word co-occurrence models to have typically EML forms such as "M d M d" and "M d d". The model "M d M d" represents a month-date-month-date co-occurrence pattern. The words in between can be represented by "Wn" where n represents the number of contiguous such words. The "M d M d" model can occur for golf events because the event could span between the last couple of days of one month and the first couple of days in the following month. Sometimes, a source document, e.g., a web-page, due to its implicit style, may publish time information that also satisfies the "d M d" where the "M" before the first "d" does not appear. This can be because the events in this case may be listed by month wherein the month word appears earlier and all events that occur during that month might appear later.

The intra-level word co-occurrence models for location can also depend on the style of the author of the source document, e.g., the web-page author. Some authors are more thorough than others in providing complete information about the location. For instance, a golf event that occurs within the United States might include the city, state and the country information for the location. So, viable intra-level word co-occurrence models for location of events could include "c C", "c S", "c S C", "C" or "S". While this embodiment of the invention has, by way of example, only three levels of granularity for location, it can be readily understood that this can be extended to represent other levels of this dimension (location) of the application specific multidimensional information, such as county, town, building, room, etc. Using prior knowledge of event characteristics, one can design different intra-level word co-occurrence models for each category of the application specific multidimensional information, e.g., for an event category, golf tournaments, or even sub-categories, golf tournaments in the United States. Since "E" can be used to represents all event keywords, the only intra-level co-occurrence model for event keywords could be of the form "En" where n represents the number of contiguous event keywords.

Once one has selected an EML encoded intra-level co-occurrence model for a given category of application specific multidimensional information, e.g., an event category, for each input document, one can encapsulate these word co-occurrence models into an inter-level word co-occurrence model representation, as is shown for example in FIG. 12(*a*). These models can form a representation for, e.g., event descriptions in a document or, e.g., form an event model. In the inter-level representation, all instances of time satisfying the intra-level co-occurrence model can be replaced by "T". Similarly, all instances of location satisfying the intra-level co-occurrence model can be replaced by "L". As pointed out earlier, an event component generally does not have intra-level variations in its word co-occurrence model, and so intra and inter level representations are the same. The same can be said for the "W" representation.

The inter-level representation can bring stability to the EML encoded patterns by reducing the pattern variations that can occur for each set of application specific multidimensional information, e.g., set of event data. The inter-level clustering of the components of a set of application specific multidimensional information can provide a model for such information data, e.g., for events. Such an event model can contain the "T", "E" and "L" components in close proximity to each other. For example, "T Wn E Wm L" can be an event description with (n, m) representing the number of contiguous words relative to the nearest inter-level word, in this case the "T" and "E" or "E" and "L," for n and m respectively. Typically, n and m can be restricted to be less than, e.g., ten words. Event detection according to the present invention can be based on filtering of the EML encoded text through the recognition of inter-level EML encoded word co-occurrence models or event models occurring in a document. In FIG. 12(*b*), there is shown how the event models emerge after transforming the intra-level representation of documents in FIG. 11(*c*) to the inter-level representation as discussed above.

The event models that emerge by using EML encoded word co-occurrence models according to the present invention, can be detected in the document. In the case of considering only dense pages, events are typically occurring in the form of lists. These lists can either be structured, e.g., with the contents listed in the form of a table, or unstructured. If the listing is structured, then the present invention can exploit the structure for event detection and extraction, as is described in more detail below. If the listing is not structured, then in accordance with the present invention one can resort to a heuristic approach. Such an approach can take advantage of the fact that, despite lacking obvious structure, listings found in dense event pages can have a cyclical nature to the listing style. A cyclical pattern can be manifested in a form such as "T Wn L Wm E . . . T Wi L Wj E . . . " or "L Wn T Wm E . . . L Wi T Wj E . . . " or other similar combinations. Another important feature that can be utilized is that the cyclical event pattern is ordinarily consistent across the page. Thus, to detect and extract events accurately, according to the present invention one can first mark the event models, as described above, and then determine the cyclical event pattern in the document, if there is one, and then extract the event information taking advantage of the discovered cyclical event pattern.

Given that a cyclical pattern to be identified is ordinarily consistent across the entire page, a key task in extracting a cyclical event pattern in a dense event page can be to identify the event component (i.e., "T", "L" or "E") that was listed first in each of the actual event descriptions having the same cyclical pattern. This event component can be referred to as the leader and the process to identify the leader can be referred to as leader identification. Once the leader has been identified, then from the event models, the exact form of the event pattern, such as "T Wn E Wm L", "L Wn E Wm T," etc., that repeats in a cyclical fashion can be determined and can then be known. This information can then be used to sequentially detect and extract all event listings from the document.

A first step in leader identification can be to generate sets of hypothesis event sets, which can equal in number the dimensions of the application specific multidimensional information, e.g., three sets that represent the hypothesis in the event example, i.e., "T", "E" and "L" are each a possible leader. To construct those hypothesis sets with "T" as its leader, the EML encoded document is searched for the first occurrence of "T". Then, using "T" as an anchor, all word elements, which may contain the other two dimensional components, e.g., the "E" and "L" of the event example, which thus represent a complete event, can be appended to the anchor until the next instance of "T" occurs. All the word elements included thus far may be jointly labeled as a member of the "T" hypothesis set. This process can then be repeated for all the "T" anchors in the document to extract the remaining members that belong to the "T" hypothesis set. The same process can then be repeated with "E" and "L" as anchors and their corresponding hypothesis sets constructed as just described.

Once the three hypothesis sets are constructed, then the next step can be to prune the contents of a set formed by combining each of the three hypothesis sets, by removing those members that do not satisfy the template for an EML encoded event model. For example, if the hypothesis set for "T"={"E W4 L", "T W5 L", "T W2 E W4 L", "T W64 E L", "T L W3 E"}, then the second ("T W5 L") and fourth ("T W64 E L") members may be determined to be subject to being pruned. The second member may be determined to be pruned because there is no "E" component within it and thus represents an incomplete event model component. The fourth member may also be determined to be subject to being pruned because the number of contiguous words, in this case 64, does not satisfy the neighborhood properties as may be defined for an acceptable event model component. The pruning process can also be completed for all the three hypothesis sets separately.

Each pruned hypothesis set can then be clustered into event model clusters. The prototype for each event model cluster contains only the event components ("T", "L" and "E") in the order in which they appear within each member of the pruned hypothesis set. For the example above, there are two cluster prototypes: "TEL" and "TLE". These clusters can represent plausible event models for the leader "T". The frequency of each cluster is measured as the number of instances that a match was found for a cluster prototype within each pruned hypothesis set. In the example above, the frequency for "TEL" is 2 while that for "TLE" is 1. Similar statistics can be computed for the remaining two hypothesis sets. The cluster with the maximum frequency can be identified as the winner. The leader of the hypothesis set that the winner belongs to can be identified as the leader for all events found in the page.

Using the leader hypothesis set, all events for a given dense event page can be readily extracted. The final format of the extracted event can contain four components, "T L E I". Here the "I" field can correspond to an information field. This information field can be created to store any special information that may be available with the extracted event. For example, in the case of golf events, the "I" field could include information related to the name of the golf course, telephone numbers or links to web-sites that may sell tickets for the event, etc. The information for the "I" field can be extracted from the other word lists such as "Wn" or "Wm" that appear, e.g., next to the event location. The information field according to this embodiment of the present invention can primarily serve to add additional value to user applications that may require them or at least find the information additionally useful, without it specifically being a dimension of the multidimensional information being sought to be extracted from the documents according to the present invention. The final design of the "I" field can thus be based on the need of the user application, if any.

While the overall process described thus far works very well for most cases, there can be special cases that need to be addressed. A first can be the case where the frequencies for two different leader clusters are identical. This can be resolved by first comparing the ratio of the frequency of the leader cluster to the total number of members in the corresponding un-pruned hypothesis set. Such a process can help in identifying the cluster with less noise and hence the more robust leader. If this ratio remains equal then the selected leader can be selected, e.g., as the one that appears earlier in the document. A second special case can correspond to the situation where the pruned hypothesis sets are the null sets for all the three cases. This can occur, e.g., if all the multidimensional information descriptions, e.g., event descriptions in the page are incomplete. For example, some dense golf web-pages may actually list only the time and event type without any location information. This case can be resolved by directly processing the un-pruned hypothesis sets. The finally extracted events from such sites are stored as "incomplete events" in the event database.

Figure 13:
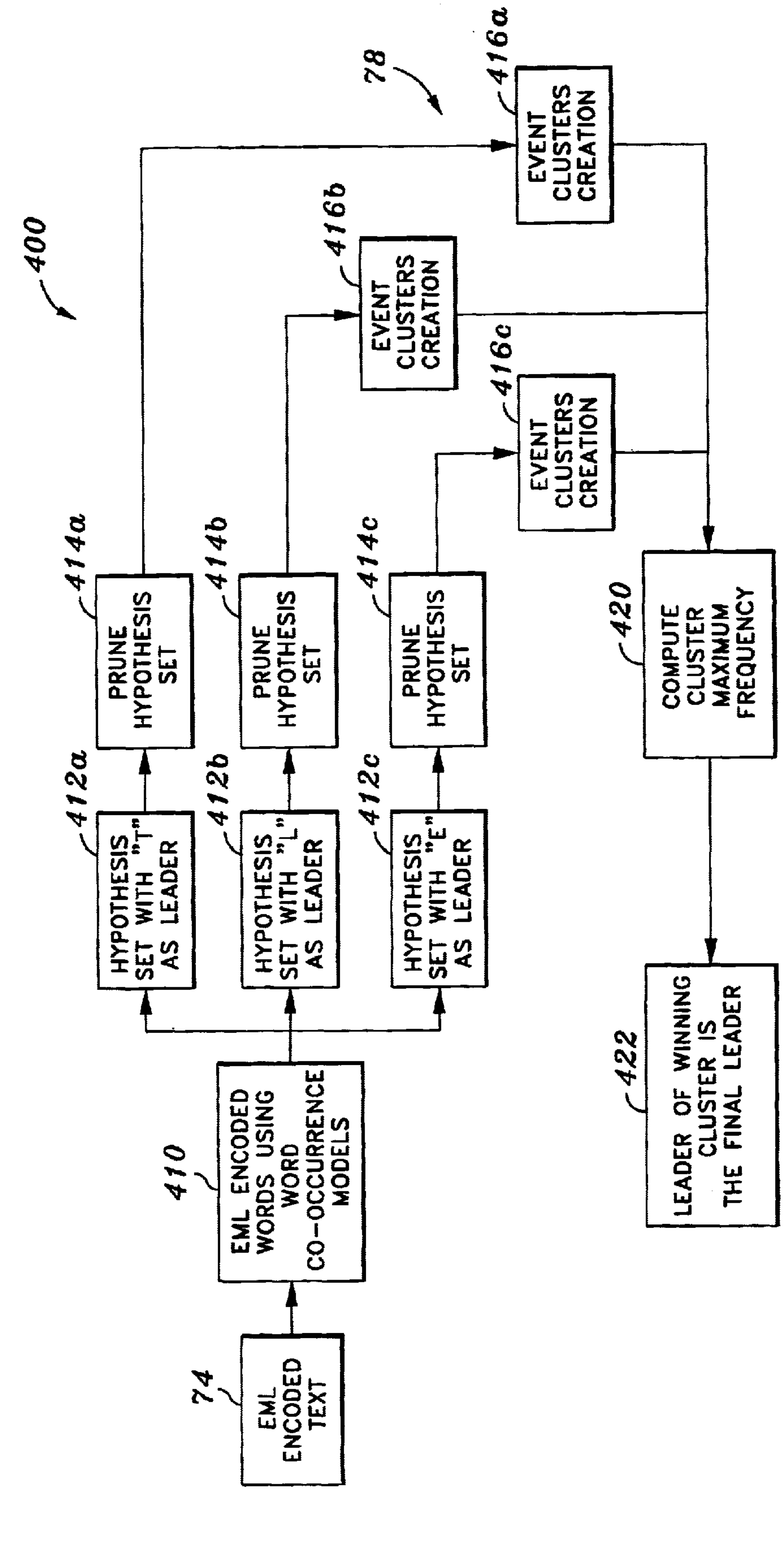
FIG. 13 shows a flowchart for an event component leader identification process useful in implementing the present invention.

A flowchart 400 describing the various steps in the event detection and extraction using the text-based approach is outlined in FIG. 13. EML encoded text is produced in block 72, corresponding to block 72 in FIG. 2. In block 410 the EML encoded words are organized using the word, co-occurrence models. In the blocks 412*a*, 412*b*, and 412*c*, the hypothesis sets can be constructed with "T," "L," and "E" as the prospective leaders respectively. In the blocks 414*a*, 414*b* and 414*c*, the respective hypothesis sets with "T," "L," and "E" as prospective leaders, respectively, can be pruned. In the blocks 416*a*, 416*b* and 416*c*, respectively, the pruned hypothesis sets with "T," "L," and "E" as leaders, respectively, can be clustered by event component. In block 420, the cluster with the highest frequency can be determined, which can be output in block 422 as the winning cluster, which can be treated as the final leader.

A goal of the present invention is to accurately detect and elicit scheduled events from, e.g., the Web. In the example of the Web, most of the information is currently presented in a loosely structured natural language text with no agent-friendly semantics. Above is described a method for extracting scheduled events from electronically searchable documents, e.g., web-pages considered as unstructured text. The present invention can also make use of methods that make use of the structural or formatted markers, e.g., HTML markup tags, e.g., present in Web documents. HTML tags, which enabler effective display of Web pages, in the absence of further processing, provide very little insight in to the content of the document. An intelligent agent designed to extract application specific multidimensional information, e.g., event information, accurately should be independent of the source document, e.g., the web-site it traverses. Extraction of desired information from source documents, e.g., web-pages on the web can be a non-trivial task that can be further complicated by the ubiquitous presence of irrelevant information (e.g., advertisement, headings, links, frames, images, multi-media, and other markup tags).

The present invention involves understanding the source documents, e.g., web documents in order to elicit the type of application specific multidimensional information that is sought, e.g., event information. The present invention can be utilized to identify, e.g., scheduled event information, e.g., by using HTML markup language delimiters. Information extraction is very similar to pattern classification. However, in text mining one needs to ascertain the boundaries of tokens that can be used as features. By using, e.g., selected HTML delimiter tags one can identify coherent text segments. The spatial relations between these text-segments can also be effectively used to find application specific multidimensional information, e.g., event information, being described in a source document, e.g., a web-page. Another aspect to keep in mind is that event information is usually available in related or linked source documents, e.g., either on a single web-page or a collection of several web-pages interconnected, e.g., by hyperlinks. For example, one dimension of the multidimensional information, e.g., the location information of an event, (e.g., Los Angeles), can be on a particular page and the specific event and the times, (e.g., LA open golf, Mar 2–4), could be on a different page. The multidimensional information, therefore, may need to be accurately propagated from page to page until the information sought, e.g., the event description, is complete. The present invention can be utilized to extract information using a combination of heuristic search and pattern matching techniques. Inductive learning techniques like CN2, SRV, C5 and FOIL, referenced above, can also be used to automatically discover rules for extracting the required multidimensional information, e.g., event information.

In the example of searching web-pages, e.g., utilizing a web crawler or other suitable search agent, the HTML source corresponding to a web page that the crawler traverses can first be transformed into manageable chunks of data. One assumption that might be made, for the example of web-pages, is that the information corresponding to a dimension of the multidimensional data being sought, e.g., an event description, almost always starts on a new line. The present invention, therefore, can filter out, e.g., the head and tail parts of the HTML script. The remaining document can then be broken into small segments for analysis. HTML tags are often employed for various purposes. Examples of these tags include <html>, <table>, <ul>, <pre>, <p>, <tr>, <td>, <li>, <hr>, <h>, <h[1–4]>, and <br>. The choice of a specific tag for a delimiter can vary from web-site to web-site, which can contribute to the difficulty in extracting information using simple and hard-coded rules. According to the present invention, the HTML tags can be sorted into a level based hierarchy in block 80, for example, <html> can be specified as a Level 1 tag, and <table> to be a Level 2 tag, and <tr> that are usually inside the <table> tag to be Level 3 tags. This hierarchy and a restriction on the segment size can be used to recursively fragment the HTML document. If the Level 2-based segments are bigger than a certain size, then, according to an embodiment of the present invention, the next level delimiters can be used to further split the segment. This process can be recursively done until the segments are of a desired size. Once the segments are extracted, the present invention can search for desired dimensions of the application specific multidimensional information being sought, e.g., the T, L, and E event information. It will be understood by those skilled in the art that other forms of electronically searchable documents accessible over a network such as the Internet in formats such as "Word" or "WordPerfect," or in other formats such as .pdf, which may be converted through the use of software programs known to enable such conversions into such formats as "Word" or "WordPerfect," will have embedded within them similar types of word-processing delimiters that can be similarly hierarchically utilized to segment the document in preparation for the extraction of the sought after application specific multidimensional information.

Since concept information specific to the application specific multidimensional information can be made available during and after the E-Space projection process, as described above, the present invention can have access to keywords corresponding to that concept. The previously defined Event Markup Language can be used to encode the textual data within a segment, as described above. This encoded data can then be used to find instances of one of the dimensions of the application specific multidimensional information, e.g., the T, L, and E event information in the segments. The present invention can be used to ensure that neighboring segments can also be searched to possibly find remaining or additional dimensions of the sought after information, e.g., additional dimensions of the T, L and E event information.

An often seen aspect in, e.g., scheduled-event pages is that the information is organized using tables. HTML table tags can be used to understand the structure of the information. The contents of each cell can be matched with T, L, and E tokens using the Event Markup Language. Once the order of occurrence of the three components/dimensions/tokens T, L, and E is ascertained, through analysis of each such component/dimension/token, corresponding to a component/dimension/token of the application specific multidimensional information, such as the event T, L and E event information, the present invention can extract the contents of each row of the table as a relevant event.

The events extracted through either a text-based approach or the markup language based approach can first be stored in a temporary buffer storing the possible application specific multidimensional information, e.g., an event information buffer 100 in FIG. 2. The purpose of this buffer 100 is to collect evidence for all application specific multidimensional information, e.g., the event information, before they are validated as accurate events. After the validation is complete, events can be pushed into the event database 40 that serves user applications. The validation process can utilize the implicit assumption that there will be more than one source document, e.g., web sites that cite any particular application specific multidimensional information, e.g., event information. Hence the present invention can be configured to only accept event information in the database 40 when more than a single information source can be used to corroborate an event. In this embodiment of the invention, events could be occurring on a global scale. Therefore events should be accepted only when validated, e.g., by multiple information sources. In other embodiments this constraint can be relaxed somewhat.

Two key components to a validation process can be defined. The first can be a process that defines how to build evidence for the validity of particular application specific multidimensional information, e.g., the event and its scheduled time and location. In order to build evidence, the present invention can match events from the temporary buffer 100 with either newly extracted events or with events from the current event database 40. In the latter case, events may be placed in the event database 40 at some level of confidence, but still be subject to having the level of confidence upgraded, and/or with some form of tag or other marking, e.g., a confidence field in the database, that prevents or conditions the reliance on the event data until some selected level of confidence is achieved. This process implies that a similarity criterion can be defined for matching two occurrences of the extraction of application specific multidimensional information, e.g., two sets of event information.

A second component can be an evidence accumulation scheme that decides when the accumulated evidence, e.g., for a given event, warrants pushing the event to the event database 40 and/or upgrading its current confidence rating, in block 108. The validation process thus can be used to ensure that the extracted application specific multidimensional information, e.g., the event information, is corroborated by at least two information source documents and thus will be more reliable and accurate.

A key problem in defining a similarity criterion for establishing confidence in the application specific multidimensional information, e.g., the event information, is the fact that descriptions of one or more of the components/dimensions/tokens of the application specific multidimensional information, e.g., the event descriptions, from two different source documents can have a lot of variation in terms of the individual dimensions/components/tokens. For example, in the case of event information, the time descriptions for an event from one source document may contain only the month information while that from a second source document may include both a month and day as well. As an example, regarding event information, this problem can be further exacerbated when incomplete event descriptions have to be to matched with other complete or incomplete events. This can require a flexible matching algorithm that can accommodate inexact or fuzzy matches in the descriptions of one or more dimensions of the application specific multidimensional information, e.g., event descriptions.

In the present invention, a novel event similarity criterion can be used for matching events as outlined below. The overall similarity criterion for, e.g., an event, can be formulated as a weighted sum of four partial similarity criteria. The four parts can correspond to the "T", "L", "E" and "I" components in the event example of the application specific multidimensional information being sought. Given, e.g., the "T" components for any two events that are to be matched, a first step can be to transform them into a canonical time reference format. This format can have the template "day-month-year:hours-min-secs" where all the six fields can be numeric in nature. This format can provide a common space to match the time component of the dimensions of e.g., any two sets of event data/information. To perform this transformation, one can use, e.g., in block 100, a standard conversion or look-up table that can recognize as inputs various forms of each field and then convert the recognized form into a specifically selected form of numeric data. For example, if an extracted event has "Jan." for the month portion of the time, then the table outputs a "1" or "01" or "0001" for month field depending upon the specifically selected form and format for the data in the appropriate field of the database 40. Such a table can be readily constructed for various fields in the canonical time reference format.

Another interesting feature that can be added in another embodiment of the invention is the ability to interpret neighboring words of time keywords in a source document. This interpretation can enable the system to intelligently fill in the format. For example, the words such as "next," "before," "after," "following," etc. can be inferred in the context of the time keyword. If the text has the words "next June", then this can be interpreted as "the June of next year" and the appropriate fields of the canonical time format, in this case the year field, can be completed along with the month field, in this case, e.g., "06" to represent the month of June information and the year field completed by the present year incremented by 1.

Depending on the nature of the application specific multidimensional information, e.g., the event information, some fields of this template may not be available in some or all source documents. Furthermore, due to variations in the style of publishing between two different information sources, the dimensions/components/tokens, e.g., the time components, of two similar events may not contain information for all the matching fields of the canonical time reference format. Thus, according to the present invention, one must identify all the fields in the canonical time reference template that have information, e.g., in the event example, for both of the events. For each of these fields, a numeric distance can be measured as, e.g., the absolute difference between its field contents for the two events being compared. For the day, month and year fields, the match may be considered accurate only when the numeric distance is zero. For the remaining three fields in the canonical time reference format, in some cases, one can allow for a more tolerant numeric distance. This tolerance can vary for each event category, depending on, e.g., the time scale for that category. For example, basketball events last between 2 to 3 hours, and so one can allow (i.e., give a numeric distance score of greater than zero) larger numeric distances in the "mins" and "secs" fields, but require stricter match criteria for mismatches in the "hours" field. Once the numeric distances are tabulated for all the available fields in both the events that are being compared, a net final score can be provided for similarity in their time components, e.g., as a ratio of the sum of the numeric distances for all the available fields to the total number of fields available for comparison. If this ratio is close to zero, then a matching score of one can be assigned in box 106. This score can imply that the two events are considered to match in terms of when the events are going to take place.

Given the "L" components for any two events, in the event information example of the present inventions, which "L" components are to be matched, a first step can be to transform them into a canonical location reference format. This format can have a template "city-state-country-continent" where all the four fields can be in the form of strings of text data. This format can provide a common space to match, e.g., the location component of any two events. Unlike the time format, the fields of the location format can be linked via a spatial inheritance map. This map can be in the form of a location database that contains information about the relationship between the various fields. For example, if the location information available from an extracted event is "Los Angeles", then the spatial inheritance map allows supplying the remaining fields in the database entry as "California-United States-North America," since there is a one-to-one relationship between the fields. For many-to-one cases, only the unambiguous fields are able to be filled. For example, if the event location is extracted as "Australia", then only the continent field can be filled as "Australia" and the remaining fields may be left empty. There can also be cities such as "Portland" which are present in more than a single state. In that case, the state field may be left empty while the country field ("United States") and continent field ("North America") can be filled. Similar to the time information, a look-up or conversion table may be employed to transform various possible complete and, e.g., abbreviated forms of, e.g., "Australia," i.e., "Aus." and "Aust." into the specified form and format utilized in the "Continent" field of the database.

Similar to the time information, one can first identify all the fields in the canonical location reference template that have information for both the events. For each of these fields, a distance of zero can be assigned if there is perfect match between the corresponding strings for the location dimension for each of the two events being compared. Once the distances are tabulated for all the available fields in both the events that are being compared, a net final distance can be provided to measure the similarity in the location components, e.g., as a ratio of the sum of the matching scores for all the available fields to the total number of fields available for comparison. If this distance is zero, then a similarity score of one can be assigned. This score can reflect the fact that the two events can be considered to match in terms of where the events are going to take place.

A similar string based matching procedure can be adopted for matching both the event ("E") and info ("I") dimensions/components/tokens. The only difference is that there may not be reference formats or spatial inheritance information for certain types of dimension/component/token information, as is so for the "E" and "I" components in the event information example. The distance measure can instead be calculated as the ratio of the total number of strings matched to the total number of strings available in that field. Distance scores of 0.75 and above may then be considered as good matches and assigned a final score of one. It will be understood that techniques such as the utilization of a thesaurus-like look-up table to expand or stem words, can be employed to match, e.g., event information, e.g., "Championship" derived from, e.g., "Champ." or "Amateur" derived from, e.g., "Amat." using, e.g., look up tables as described above for this and other more category specific dimensions of the information, like the type of event.

Once the matching scores for each of the four event components have been calculated, then a final score can be assigned for the entire event as a weighted sum of the "T", "L" and "E" sub-scores in box 108. In this embodiment of the invention, the weight assignment can be equal (i.e., 0.333) for each component. So, if two events are identical, this convex weight assignment can ensure that the final sum is equal to one as determined in box 104. The matching score for the "I" field may just be used to append additional information for the matched events. If the "I" field is available for both the events being compared, and if the matching score is one, then no change may be necessary. If the "I" field comparison results in a matching score of zero, then the "I" field can be appended to the event. Finally, if there is a partial match, then in that case the two "I" fields may be combined. For example, when the "I" field for one event contains the "golf course and its telephone number" while the other contains the "golf course and its Web site address". Then the final event "I" field, if weighted matching score is one, may be the golf course, its telephone number and its Web site address.

One special case according to the present invention, in the event information example, by way of example, is where one of the two events being matched has incomplete information. For example, there may be one event with "T", "L" and "E" information while the another event may have only the "T" and "E" components. In this case, the matching scores for the individual components can be used as a part of evidence as will be discussed below. However, e.g., if both the events contain partial/incomplete information, then neither event may be selected to contribute to the evidence accumulation. It should be noted that for the purposes of the present invention, the inventors have not addressed the issue of the efficiency of the search of candidates from the temporary event buffer 100 or from the event database 40 for event matching, and more efficient approaches than disclosed herein may be possible.

Events that are extracted using both the markup language approach and the text-based approach in block 70 and 80 can first be matched with events in the temporary event buffer 90 as well as the event database 40, as described above. The matching scores can then be used to accumulate evidence in block 108. There can be different scenarios for evidence accumulation. The first scenario can correspond to a perfect match, i.e., if the weighted score is one, between events stored in the temporary event buffer 100 or between an event that is stored in the event database 40 and an event in the temporary event buffer 100. In such a case, a confidence count in block 108 for the event in the database 40 can be increased, e.g., by the weighted score. The higher the confidence, the more reliable the information regarding the event. Furthermore, new information can be added via the "I" field if warranted.

A second scenario can correspond to the case where there is a perfect match, i.e., if the weighted score is one, between two events in the temporary event buffer 90. In that case, the evidence count for the event in the buffer 90 can be increased, e.g., by the weighted score. This process is called evidence accumulation. When the accumulated evidence for any event in the buffer 90 is more than two counts, that event can then be designated as a potential candidate to be pushed into the event database 40. In this second scenario, the information field for the event candidate may also updated, e.g., as in the first scenario. It should be noted that all events that first appear in the temporary event buffer 90 have an accumulated evidence of zero.

A third scenario can correspond to matches between complete events (either in the event database 40 or in the event buffer 90) and incomplete events found in the temporary event buffer 90. In this case, the weighted score may not be one.

These scores can still be added as evidence for the event with complete information, if that event is found in the temporary event buffer 90 or the database 40. They can be added to the confidence score if the complete event is found in the event database 40. Since these values can be integers fractions, a fixed threshold of two counts can be selected to force the system to require more evidence before the partial matches result in certifying an event as a potential candidate. This feature can be very desirable and make the system more accurate and yet flexible.

The flexibility aspect can now be highlighted via an example. Consider, for example, the case where a full event (i.e., "T", "L" and "E") exists in the buffer 90 or the database 40, and it is partially matched with an incomplete event, having, e.g., "T" and "E" present, but the information relating to the "L" dimension/component/token missing. At this point, the evidence accumulated supporting the validation of the full event might be considered to be 0.666. If an event from another source provides another incomplete version of the same event, e.g., with "L" and "E" information present, but no "T," then this also can be used to accumulate further evidence for the validation of the event. Now the accumulated evidence can be considered to be 1.333. This system is flexible because even if information is obtained in small pieces, the present invention is capable of "piecing" the evidence together so as to finally store the event in the event database as a verified event.

Once an event satisfies a selected threshold for evidence accumulation for sufficient verification of the event, it can become a validated part of the event database 40. Here it can be accessed by the user or automatically inserted into a user application, e.g., an electronic calendar, by becoming, e.g., an entry in the calendar for the event "E" at the location "L" and entered into the calendar at the particular time "T."

Figure 14A:
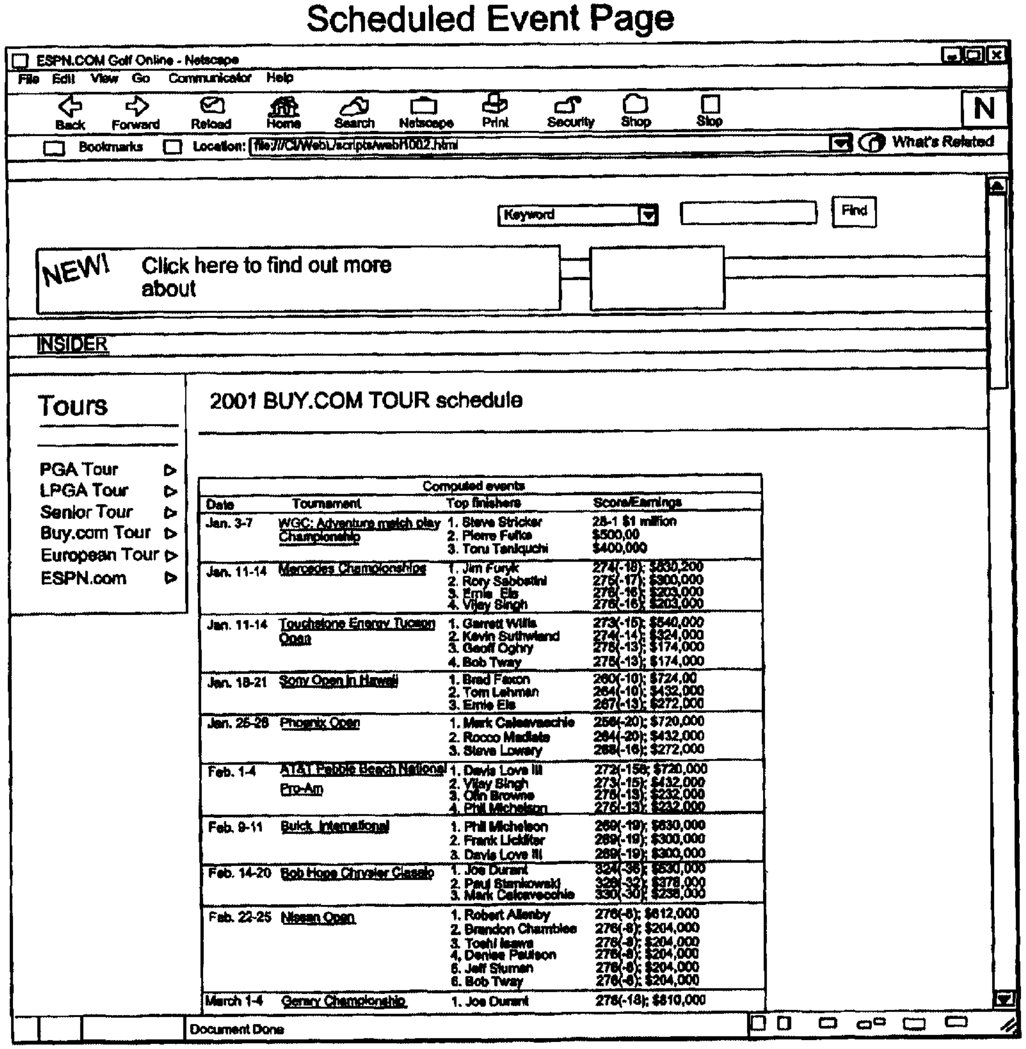
FIG. 14 shows an example of the extracted application specific multi-dimensional information useful in implementing the present invention.

Before this is done, the system may verify in block 92 if the event is from the past, present or future. This can be performed in block 92 by obtaining the current time information using, e.g., the web crawler 34, or other suitable time reference, e.g., the user calendar application itself or the user time clock on the user computing system, and then comparing the time content "T" of the event "E" with the current time information. If the time content for the event reflects that it is a future event, then it can be pushed into the event database 40. An example of validated events in the "TELI" format for the golf category is shown in FIG. 14(*a*), as may be displayed on a user interface screen display, and in FIG. 14(*b*) in list format.

The foregoing invention has been described in relation to a presently preferred embodiment thereof. The invention should not be considered limited to this embodiment. Those skilled in the art will appreciate that many variations and modifications to the presently preferred embodiment, many of which are specifically referenced above, may be made without departing from the spirit and scope of the appended claims. The inventions should be measured in scope from the appended claims.

We claim:

1. An apparatus for providing application specific multidimensional information to an application running on a user computing device, wherein at least one dimension of the information is a category, from a plurality of member documents electronically extracted from a library of electronically searchable documents, comprising:

an application specific multidimensional information extractor adapted to extract occurrences of prospective representations of dimensions of application specific multidimensional information from the member documents, and to extract occurrences of non-application specific multidimensional information from the member documents.

2. The apparatus of claim 1 wherein the application specific multidimensional information extractor further comprises:

an encoder adapted to encode the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element.

3. The apparatus of claim 1 further comprising:

a member document identifier adapted to determine whether a member document contains coded formatting, and if not, whether the member document is a dense document, and if not, for rejecting the document from further processing.

4. The apparatus of claim 3, wherein the coded formatting comprises network markup language coding.

5. The apparatus of claim 2 further comprising:

a member document identifier adapted to determine whether a member document contains coded formatting, and if not, whether the member document is a dense document, and if not, for rejecting the document from further processing.

6. The apparatus of claim 5 wherein the coded formatting comprises network markup language formatting.

7. An apparatus according to claim 1, further comprising:

an application specific multidimensional information verification unit adapted verify the extraction of application specific multi-dimensional information from the member documents.

8. An apparatus according to claim 2, further comprising:

an application specific multidimensional information verification unit adapted verify the extraction of application specific multi-dimensional information from the member documents.

9. An apparatus according to claim 3, further comprising:

an application specific multidimensional information verification unit adapted verify the extraction of application specific multi-dimensional information from the member documents.

10. An apparatus according to claim 4, further comprising:

an application specific multidimensional information verification unit adapted verify the extraction of application specific multi-dimensional information from the member documents.

11. An apparatus according to claim 5, further comprising:

an application specific multidimensional information verification unit adapted verify the extraction of application specific multi-dimensional information from the member documents.

12. An apparatus according to claim 6, further comprising:

an application specific multidimensional information verification unit adapted verify the extraction of application specific multi-dimensional information from the member documents.

13. An apparatus according to claim 7, further comprising:

a database for storing the application specific multidimensional information adapted to provide an application running on a user computing device access to the application specific multidimensional information.

14. An apparatus according to claim 8, further comprising:

a database for storing the application specific multidimensional information adapted to provide an application running on a user computing device access to the application specific multidimensional information.

15. An apparatus according to claim 9, further comprising:

a database for storing the application specific multidimensional information adapted to provide an application running on a user computing device access to the application specific multidimensional information.

16. An apparatus according to claim 10, further comprising:

a database for storing the application specific multidimensional information adapted to provide an application running on a user computing device access to the application specific multidimensional information.

17. An apparatus according to claim 11, further comprising:

a database for storing the application specific multidimensional information adapted to provide an application running on a user computing device access to the application specific multidimensional information.

18. An apparatus according to claim 12, further comprising:

a database for storing the application specific multidimensional information adapted to provide an application running on a user computing device access to the application specific multidimensional information.

19. The apparatus of claim 7 wherein the application specific multidimensional information verification unit further comprises:

a comparing unit adapted to compare occurrences of application specific multidimensional information from more than one member document and thereby increase the confidence level of the accuracy of the particular application specific multidimensional information.

20. The apparatus of claim 8 wherein the application specific multidimensional information verification unit further comprises:

a comparing unit adapted to compare occurrences of application specific multidimensional information from more than one member document and thereby increase the confidence level of the accuracy of the particular application specific multidimensional information.

21. The apparatus of claim 9 wherein the application specific multidimensional information verification unit further comprises:

a comparing unit adapted to compare occurrences of application specific multidimensional information from more than one member document and thereby increase the confidence level of the accuracy of the particular application specific multidimensional information.

22. The apparatus of claim 10 wherein the application specific multidimensional information verification unit further comprises:

a comparing unit adapted to compare occurrences of application specific multidimensional information from more than one member document and thereby increase the confidence level of the accuracy of the particular application specific multidimensional information.

23. The apparatus of claim 11 wherein the application specific multidimensional information verification unit further comprises:

a comparing unit adapted to compare occurrences of application specific multidimensional information from more than one member document and thereby increase the confidence level of the accuracy of the particular application specific multidimensional information.

24. The apparatus of claim 12 wherein the application specific multidimensional information verification unit further comprises:

a comparing unit adapted to compare occurrences of application specific multidimensional information from more than one member document and thereby increase the confidence level of the accuracy of the particular application specific multidimensional information.

25. An apparatus according to claim 19, further comprising:

a database for storing the application specific multidimensional information adapted to provide an application running on a user computing device access to the application specific multidimensional information.

26. An apparatus according to claim 20, further comprising:

a database for storing the application specific multidimensional information adapted to provide an application running on a user computing device access to the application specific multidimensional information.

27. An apparatus according to claim 21, further comprising:

a database for storing the application specific multidimensional information adapted to provide an application running on a user computing device access to the application specific multidimensional information.

28. An apparatus according to claim 22, further comprising:

a database for storing the application specific multidimensional information adapted to provide an application running on a user computing device access to the application specific multidimensional information.

29. An apparatus according to claim 23, further comprising:

a database for storing the application specific multidimensional information adapted to provide an application running on a user computing device access to the application specific multidimensional information.

30. An apparatus according to claim 24, further comprising:

a database for storing the application specific multidimensional information adapted to provide an application running on a user computing device access to the application specific multidimensional information.

31. The apparatus of claim 19 wherein the comparing unit is further adapted to compare occurrences of incomplete elements of respective dimensions of the application specific multidimensional information.

32. The apparatus of claim 20 wherein the comparing unit is further adapted to compare occurrences of incomplete elements of respective dimensions of the application specific multidimensional information.

33. The apparatus of claim 21 wherein the comparing unit is further adapted to compare occurrences of incomplete elements of respective dimensions of the application specific multidimensional information.

34. The apparatus of claim 22 wherein the comparing unit is further adapted to compare occurrences of incomplete elements of respective dimensions of the application specific multidimensional information.

35. The apparatus of claim 23 wherein the comparing unit is further adapted to compare occurrences of incomplete elements of respective dimensions of the application specific multidimensional information.

36. The apparatus of claim 24 wherein the comparing unit is further adapted to compare occurrences of incomplete elements of respective dimensions of the application specific multidimensional information.

37. The apparatus of claim 31 further comprising:

a database for storing the application specific multidimensional information adapted to provide an application running on a user computing device access to the application specific multidimensional information.

38. The apparatus of claim 32 further comprising:

a database for storing the application specific multidimensional information adapted to provide an application running on a user computing device access to the application specific multidimensional information.

39. The apparatus of claim 33 further comprising:

a database for storing the application specific multidimensional information adapted to provide an application running on a user computing device access to the application specific multidimensional information.

40. The apparatus of claim 34 further comprising:

a database for storing the application specific multidimensional information adapted to provide an application running on a user computing device access to the application specific multidimensional information.

41. The apparatus of claim 35 further comprising:

a database for storing the application specific multidimensional information adapted to provide an application running on a user computing device access to the application specific multidimensional information.

42. The apparatus of claim 36 further comprising:

a database for storing the application specific multidimensional information adapted to provide an application running on a user computing device access to the application specific multidimensional information.

43. An apparatus for providing scheduled event information to an application running on a user computing device, wherein at least one dimension of the information is an event category, from a plurality of member documents electronically extracted from a library of electronically searchable documents, comprising:

an event information extractor adapted to extract occurrences of prospective representations of the time, location and event identity from the member documents, and to extract occurrences of non-prospective event related information from the member documents, said event information extractor comprising an encoder adapted to encode the occurrences of prospective representations of the time, location and event identity information and non-prospective event related information contained in member documents according to a time, location and event identity specific coded representation of each of the occurrences of the time, location and event identity information and a coded representation of non-prospective event related information.

44. An apparatus for providing scheduled event information to an application running on a user computing device, wherein at least one dimension of the information is an event category, from a plurality of member documents electronically extracted from a library of electronically searchable documents, comprising:

an event information extractor adapted to extract occurrences of prospective representations of the time, location and event identity from the member documents, and to extract occurrences of non-prospective event related information from the member documents; and a member document identifier adapted to determine whether a member document contains coded formatting, and if not, whether the member document is a dense document, and if not for rejecting the document from further processing.

45. The apparatus of claim 44, wherein the coded formatting comprises network markup language coding.

46. The apparatus of claim 43 further comprising:

a member document identifier adapted to determine whether a member document contains coded formatting, and if not, whether the member document is; a dense document, and if not, for rejecting the document from further processing.

47. The apparatus of claim 46 wherein the coded formatting comprises network markup language formatting.

48. An apparatus for providing scheduled event information to an application running on a user computing device, wherein at least one dimension of the information is an event category, from a plurality of member documents electronically extracted from a library of electronically searchable documents, comprising:

an event information extractor adapted to extract occurrences of prospective representations of the time, location and event identity from the member documents, and to extract occurrences of non-prospective event related information from the member documents; and a scheduled event verification unit adapted verify the extraction of scheduled event information from the member documents.

49. An apparatus according to claim 43, further comprising:

a scheduled event verification unit adapted verify the extraction of scheduled event information from the member documents.

50. An apparatus according to claim 44, further comprising:

a scheduled event verification unit adapted verify the extraction of scheduled event information from the member documents.

51. An apparatus according to claim 45, further comprising:

a scheduled event verification unit adapted verify the extraction of scheduled event information from the member documents.

52. An apparatus according to claim 46, further comprising:

a scheduled event verification unit adapted verify the extraction of scheduled event information from the member documents.

53. An apparatus according to claim 47, further comprising:

a scheduled event verification unit adapted verify the extraction of scheduled event information from the member documents.

54. An apparatus according to claim 48, further comprising:

a database for storing the scheduled event information adapted to provide an application running on a user computing device access to the scheduled event information.

55. An apparatus according to claim 49, further comprising:

a database for storing the scheduled event information adapted to provide an application running on a user computing device access to the scheduled event information.

56. An apparatus according to claim 50, further comprising:

a database for storing the scheduled event information adapted to provide an application running on a user computing device access to the scheduled event information.

57. An apparatus according to claim 51, further comprising:

a database for storing the scheduled event information adapted to provide an application running on a user computing device access to the scheduled event information.

58. An apparatus according to claim 52, further comprising:

a database for storing the scheduled event information adapted to provide an application running on a user computing device access to the scheduled event information.

59. An apparatus according to claim 53, further comprising:

a database for storing the scheduled event information adapted to provide an application running on a user computing device access to the scheduled event information.

60. The apparatus of claim 48 wherein the scheduled event information verification unit further comprises:

a comparing unit adapted to compare occurrences of time, location or event identity information from more than one member document and thereby increase the confidence level of the accuracy of the scheduled event information.

61. The apparatus of claim 49 wherein the scheduled event information verification unit further comprises:

a comparing unit adapted to compare occurrences of time, location or event identity information from more than one member document and thereby increase the confidence level of the accuracy of the scheduled event information.

62. The apparatus of claim 50 wherein the scheduled event information verification unit further comprises:

a comparing unit adapted to compare occurrences of time, location or event identity information from more than one member document and thereby increase the confidence level of the accuracy of the scheduled event information.

63. The apparatus of claim 51 wherein the scheduled event information verification unit further comprises:

a comparing unit adapted to compare occurrences of time, location or event identity information from more than one member document and thereby increase the confidence level of the accuracy of the scheduled event information.

64. The apparatus of claim 52 wherein the scheduled event information verification unit further comprises:

a comparing unit adapted to compare occurrences of time, location or event identity information from more than one member document and thereby increase the confidence level of the accuracy of the scheduled event information.

65. The apparatus of claim 53 wherein the scheduled event information verification unit further comprises:

a comparing unit adapted to compare occurrences of time, location or event identity information from more than one member document and thereby increase the confidence level of the accuracy of the scheduled event information.

66. An apparatus according to claim 60, further comprising:

a database for storing the scheduled event information adapted to provide an application running on a user computing device access to the scheduled event information.

67. An apparatus according to claim 61, further comprising:

a database for storing the scheduled event information adapted to provide an application running on a user computing device access to the scheduled event information.

68. An apparatus according to claim 62, further comprising:

a database for storing the scheduled event information adapted to provide an application running on a user computing device access to the scheduled event information.

69. An apparatus according to claim 63, further comprising:

a database for storing the scheduled event information adapted to provide an application running on a user computing device access to the scheduled event information.

70. An apparatus according to claim 64, further comprising:

a database for storing the scheduled event information adapted to provide an application running on a user computing device access to the scheduled event information.

71. An apparatus according to claim 65, further comprising:

a database for storing the scheduled event information adapted to provide an application running on a user computing device access to the scheduled event information.

72. The apparatus of claim 60 wherein the comparing unit is further adapted to compare occurrences of incomplete elements of respective dimensions of the scheduled event information.

73. The apparatus of claim 61 wherein the comparing unit is further adapted to compare occurrences of incomplete elements of respective dimensions of the scheduled event information.

74. The apparatus of claim 62 wherein the comparing unit is further adapted to compare occurrences of incomplete elements of respective dimensions of the scheduled event information.

75. The apparatus of claim 63 wherein, the comparing unit is further adapted to compare occurrences of incomplete elements of respective dimensions of the scheduled event information.

76. The apparatus of claim 64 wherein the comparing unit is further adapted to compare occurrences of incomplete elements of respective dimensions of the scheduled event information.

77. The apparatus of claim 65 wherein the comparing unit is further adapted to compare occurrences of incomplete elements of respective dimensions of the scheduled event multidimensional information.

78. The apparatus of claim 72 further comprising:
a database for storing the application specific multi-dimensional information adapted to provide an application running on a user computing device access to the scheduled event information.

79. The apparatus of claim 73 further comprising:
a database for storing the application specific multi-dimensional information adapted to provide an application running on a user computing device access to the scheduled event information.

80. The apparatus of claim 74 further comprising:
a database for storing the application specific multi-dimensional information adapted to provide an application running on a user computing device access to the scheduled event information.

81. The apparatus of claim 75 further comprising:
a database for storing the application specific multi-dimensional information adapted to provide an application running on a user computing device access to the scheduled event information.

82. The apparatus of claim 76 further comprising:
a database for storing the application specific multi-dimensional information adapted to provide an application running on a user computing device access to the scheduled event information.

83. The apparatus of claim 77 further comprising:
a database for storing the application specific multi-dimensional information adapted to provide an application running on a user computing device access to the scheduled event information.

84. An apparatus for providing application specific multi-dimensional information to an application running on a user computing device, wherein at least one dimension of the information is a category, from a plurality of member documents electronically extracted from a library of electronically searchable documents, comprising:
an application specific multidimensional information extracting means for extracting occurrences of prospective representations of dimensions of application specific multidimensional information from the member documents, and extracting occurrences of non-application specific multidimensional information from the member documents.

85. The apparatus of claim 84 wherein the application specific multidimensional information extracting means farther comprises:
an encoding means for encoding the occurrences of prospective dimensions of application specific multi-dimensional information and non-application specific multidimensional information contained, in member documents according to a dimension specific coded representation of each dimension of application specific multidimensional information and a non-application specific coded representation of each non-application specific multidimensional information element.

86. The apparatus of claim 84 further comprising:
a member document identifying means for determining whether a member document contains coded formatting, and if not, whether the member document is a dense document, and if not for rejecting the document from further processing.

87. The apparatus of claim 86, wherein the coded formatting comprises network markup language coding.

88. The apparatus of claim 85 further comprising:
a member document identifying means for determining whether a member document contains coded formatting, and if not, whether the member document is a dense document and if not for rejecting the document from further processing.

89. The apparatus of claim 88 wherein the coded formatting comprises network markup language formatting.

90. An apparatus according to claim 84, further comprising:
an application specific multidimensional information verification means for verifying the extraction of application specific multi-dimensional information from the member documents.

91. An apparatus according to claim 85, further comprising:
an application specific multidimensional information verification means for verifying the extraction of application specific multi-dimensional information from the member documents.

92. An apparatus according to claim 86, further comprising:
an application specific multidimensional information verification means for verifying the extraction of application specific multi-dimensional information from the member documents.

93. An apparatus according to claim 87, further comprising:
an application specific multidimensional information verification means for verifying the extraction of application specific multi-dimensional information from the member documents.

94. An apparatus according to claim 88, further comprising:
an application specific multidimensional information verification means for verifying the extraction of application specific multi-dimensional information from the member documents.

95. An apparatus according to claim 89, further comprising:
an application specific multidimensional information verification means for verifying the extraction of application specific multi-dimensional information from the member documents.

96. An apparatus according to claim 90, further comprising:
a database means for storing the application specific multi-dimensional information and for providing an application running on a user computing device access to the application specific multidimensional information.

97. An apparatus according to claim 91, further comprising:
a database means for storing the application specific multi-dimensional information and for providing an application running on a user computing device access to the application specific multidimensional information.

98. An apparatus according to claim 92, further comprising:
a database means for storing the application specific multi-dimensional information and for providing an application running on a user computing device access to the application specific multidimensional information.

99. An apparatus according to claim 93, further comprising:
a database means for storing the application specific multi-dimensional information and for providing an application running on a user computing device access to the application specific multidimensional information.

100. An apparatus according to claim 94, further comprising:

a database means for storing the application specific multi-dimensional information and for providing an application running on a user computing device access to the application specific multidimensional information.

101. An apparatus according to claim 95, further comprising:

a database means for storing the application specific multi-dimensional information and for providing an application running on a user computing device access to the application specific multidimensional information.

102. The apparatus of claim 90 wherein the application specific multidimensional information verification unit further comprises:

a comparing means for comparing occurrences of application specific multidimensional information from more than one member document and thereby increasing the confidence level of the accuracy of the particular application specific multidimensional information.

103. The apparatus of claim 91 wherein the application specific multidimensional information verification unit further comprises:

a comparing mew-6 for comparing occurrences of application specific multidimensional information from more than one member document and thereby increasing the confidence level of the accuracy of the particular application specific multidimensional information.

104. The apparatus of claim 92 wherein the application specific multidimensional information verification unit further comprises:

a comparing means for comparing occurrences of application specific multidimensional information from more than one member document and thereby increasing the confidence level of the accuracy of the particular application specific multidimensional information.

105. The apparatus of claim 93 wherein the application specific multidimensional information verification unit further comprises:

a comparing means for comparing occurrences of application specific multidimensional information from more than one member document and thereby increasing the confidence level of the accuracy of the particular application specific multidimensional information.

106. The apparatus of claim 94 wherein the application specific multidimensional information verification unit further comprises:

a comparing means for computing occurrences of application specific multidimensional information from more than one member document and thereby increasing the confidence level of the accuracy of the particular application specific multidimensional information.

107. The apparatus of claim 95 wherein the application specific multidimensional information verification unit further comprises:

a comparing means for comparing occurrences of application specific multidimensional information from more than one member document and thereby increasing the confidence level of the accuracy of the particular application specific multidimensional information.

108. An apparatus according to claim 102, further comprising:

a database means for storing the application specific multi-dimensional information and for providing an application running on a user computing device access to the application specific multidimensional information.

109. An apparatus according to claim 103, further comprising:

a database means for storing the application specific multi-dimensional information and for providing an application running on a user computing device access to the application specific multidimensional information.

110. An apparatus according to claim 104, further comprising:

a database means for storing the application specific multi-dimensional information and for providing an application running on a user computing device access to the application specific multidimensional information.

111. An apparatus according to claim 105, further comprising:

a database means for storing the application specific multi-dimensional information and for providing an application running on a user computing device access to the application specific multidimensional information.

112. An apparatus according to claim 106, further comprising:

a database for storing the application specific multi-dimensional information and for providing an application running on a user computing device access to the application specific multidimensional information.

113. An apparatus according to claim 107, further comprising:

a database means for storing the application specific multi-dimensional information for providing provide an application running on a user computing device access to the application specific multidimensional information.

114. The apparatus of claim 90 wherein the comparing means further comprises means for comparing occurrences of incomplete elements of respective dimensions of the application specific multidimensional information.

115. The apparatus of claim 91 wherein the comparing means further comprises means for comparing occurrences of incomplete elements of respective dimensions of the application specific multidimensional information.

116. The apparatus of claim 92 wherein the comparing means further comprises means for comparing occurrences of incomplete elements of respective dimensions of the application specific multidimensional information.

117. The apparatus of claim 93 wherein the comparing means further comprises means for comparing occurrences of incomplete elements of respective dimensions of the application specific multidimensional information.

118. The apparatus of claim 94 wherein the comparing means further comprises means for comparing occurrences of incomplete elements of respective dimensions of the application specific multidimensional information.

119. The apparatus of claim 95 wherein the comparing means further comprises means for comparing occurrences of incomplete elements of respective dimensions of the application specific multidimensional information.

120. The apparatus of claim 114 further comprising:

a database means for storing the application specific multi-dimensional information and for providing an application running on a user computing device access to the application specific multidimensional information.

121. The apparatus of claim 115 further comprising:

a database means for storing the application specific multi-dimensional information and for providing an application running on a user computing device access to the application specific multidimensional information.

122. The apparatus of claim 116 further comprising:

a database means for storing the application specific multi-dimensional information and for providing an application running on a user computing device access to the application specific multidimensional information.

123. The apparatus of claim 117 further comprising:

a database means for storing the application specific multi-dimensional information and for providing an application running on a user computing device access to the application specific multidimensional information.

124. The apparatus of claim 118 further comprising:

a database means for storing the application specific multi-dimensional information and for providing an application running on a user computing device access to the application specific multidimensional information.

125. The apparatus of claim 119 further comprising:

a database means for storing the application specific multi-dimensional information and for providing an application running on a user computing device access to the application specific multidimensional information.

126. An apparatus for providing scheduled event information to an application running on a user computing device, wherein at least one dimension of the information is an event category, from a plurality of member documents electronically extracted from a library of electronically searchable documents, comprising:

an event information extracting means for extracting occurrences of prospective representations of the time, location and event identity from the member documents, and for extracting occurrences of non-prospective event related information from the member documents, said event information extracting means comprising an encoding means for encoding the occurrences of prospective representations of the time, location and event identity information and non-prospective event related information contained in member documents according to a time, location and event identity specific coded representation of each of the occurrences of the time, location and event identity information and a coded representation of non-prospective event related information.

127. An apparatus for providing scheduled event information to an application running on a user computing device, wherein at least one dimension of the information is an event category, from a plurality of member documents electronically extracted from a library of electronically searchable documents, comprising:

an event information extracting means for extracting occurrences of prospective representations of the time, location and event identity from the member documents, and for extracting occurrences of non-prospective event related information from the member documents; and a member document identifying means for determining whether a member document contains coded formatting, and if not, whether the member document is a dense document, and if not, for rejecting the document from further processing.

128. The apparatus of claim 127, wherein the coded formatting comprises network markup language coding.

129. The apparatus of claim 128 further comprising:

a member document identifying means for determining whether a member document contains coded formatting, and if not, whether the member document is a dense document, and if not, for rejecting the document from further processing.

130. The apparatus of claim 129 wherein the coded formatting comprises network markup language formatting.

131. An apparatus for providing scheduled event information to an application running on a user computing device, wherein at least one dimension of the information is an event category, from a plurality of member documents electronically extracted from a library of electronically searchable documents, comprising:

an event information extracting means for extracting occurrences of prospective representations of the time, location and event identity from the member documents, and for extracting occurrences of non-prospective event related information from the member documents; and a scheduled event verification means for verifying the extraction of scheduled event information from the member documents.

132. An apparatus according to claim 126, further comprising:

a scheduled event verification means for verifying the extraction of scheduled event information from the member documents.

133. An apparatus according to claim 127, further comprising:

a scheduled event verification means for verifying the extraction of scheduled event information from the member documents.

134. An apparatus according to claim 128, further comprising:

a scheduled event verification means for verifying the extraction of scheduled event information from the member documents.

135. An apparatus according to claim 129, further comprising:

a scheduled event verification means for verifying the extraction of scheduled event information from the member documents.

136. An apparatus according to claim 130, further comprising:

a scheduled event verification means for verifying the extraction of scheduled event information from the member documents.

137. An apparatus according to claim 131, further comprising:

a database means for storing the scheduled event information and for providing an application running on a user computing device access to the scheduled event information.

138. An apparatus according to claim 132, further comprising:

a database means for storing the scheduled event information and for providing an application running on a user computing device access to the scheduled event information.

139. An apparatus according to claim 133, further comprising:

a database means for storing the scheduled event information and for providing an application running on a user computing device access to the scheduled event information.

140. An apparatus according to claim 134, further comprising:

a database means for storing the scheduled event information and for providing an application running on a user computing device access to the scheduled event information.

141. An apparatus according to claim 135, further comprising:

a database means for storing the scheduled event information and for providing an application running on a user computing device access to the scheduled event information.

142. An apparatus according to claim 136, further comprising:

a database means for storing the scheduled event information and for providing an application running on a user computing device access to the scheduled event information.

143. The apparatus of claim 131 wherein the scheduled event information verification unit further comprises:

a comparing means for comparing occurrences of time, location or event identity information from more than one member document and increasing the confidence level of the accuracy of the scheduled event information.

144. The apparatus of claim 132 wherein the scheduled event information verification unit further comprises:

a comparing means for comparing occurrences of time, location or event identity information from more than one member document and increasing the confidence level of the accuracy of the scheduled event information.

145. The apparatus of claim 133 wherein the scheduled event information verification unit further comprises:

a comparing means for comparing occurrences of time, location or event identity information from more than one member document and increasing the confidence level of the accuracy of the scheduled event information.

146. The apparatus of claim 134 wherein the scheduled event information verification unit further comprises:

a comparing means for comparing occurrences of time, location or event identity information from more than one member document and increasing the confidence level of the accuracy of the scheduled event information.

147. The apparatus of claim 135 wherein the scheduled event information verification unit further comprises:

a comparing means for comparing occurrences of time, location or event identity information from more than one member document and increasing the confidence level of the accuracy of the scheduled event information.

148. The apparatus of claim 136 wherein the scheduled event information verification unit further comprises:

a comparing means for comparing occurrences of time, location or event identity information from more than one member document and increasing the confidence level of the accuracy of the scheduled event information.

149. An apparatus according to claim 143, further comprising:

a database means for storing the scheduled event information and for providing an application running on a user computing device access to the scheduled event information.

150. An apparatus according to claim 144, further comprising:

a database means for storing the scheduled event information and for providing an application running on a user computing device access to the scheduled event information.

151. An apparatus according to claim 145, further comprising:

a database means for storing the scheduled event information and for providing an application running on a user computing device access to the scheduled event information.

152. An apparatus according to claim 146, further comprising:

a database means for storing the scheduled event information and for providing an application running on a user computing device access to the scheduled event information.

153. An apparatus according to claim 147, further comprising:

a database means for storing the scheduled event information and for providing an application running on a user computing device access to the scheduled event information.

154. An apparatus according to claim 148, further comprising:

a database means for storing the scheduled event information and for providing an application running on a user computing device access to the scheduled event information.

155. The apparatus of claim 143 wherein the comparing means further comprises means for comparing occurrences of incomplete elements of respective dimensions of the scheduled event information.

156. The apparatus of claim 144 wherein the comparing means further comprises means for comparing occurrences of incomplete elements of respective dimensions of the scheduled event information.

157. The apparatus of claim 145 wherein the comparing means further comprises means for comparing occurrences of incomplete elements of respective dimensions of the scheduled event information.

158. The apparatus of claim 146 wherein the comparing means further comprises means for comparing occurrences of incomplete elements of respective dimensions of the scheduled event information.

159. The apparatus of claim 147 wherein the comparing means further comprises means for comparing occurrences of incomplete elements of respective dimensions of the scheduled event information.

160. The apparatus of claim 148 wherein the comparing means further comprises means for comparing occurrences of incomplete elements of respective dimensions of the scheduled event information.

161. The apparatus of claim 155 further comprising:

a database means for storing the application specific multi-dimensional information and for providing an application running on a user computing device access to the scheduled event information.

162. The apparatus of claim 156 further comprising:

a database means for storing the application specific multi-dimensional information and for providing an application running on a user computing device access to the scheduled event information.

163. The apparatus of claim 157 further comprising:

a database means for storing the application specific multi-dimensional information and for providing an application running on a user computing device access to the scheduled event information.

164. The apparatus of claim 158 further comprising:

a database means for storing the application specific multi-dimensional information and for providing an application running on a user computing device access to the scheduled event information.

165. The apparatus of claim 159 further comprising:

a database means for storing the application specific multi-dimensional information and for providing an application running on a user computing device access to the scheduled event information.

166. The apparatus of claim 160 further comprising:

a database means for storing the application specific multi-dimensional information and for providing an application running on a user computing device access to the scheduled event information.

167. A method for providing application specific multi-dimensional information to an application running on a user computing device, wherein at least one dimension of the information is a category, from a plurality of member documents electronically extracted from a library of electronically searchable documents, comprising:

extracting occurrences of prospective representations of dimensions of application specific multidimensional information from the member documents, and extracting occurrences of non-application specific multidimensional information from the member documents.

168. The method of claim 167 wherein the application specific multidimensional information extracting step further comprises:

encoding the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element.

169. The method of claim 167 further comprising:

determining whether a member document contains coded formatting, and if is not whether the member document is a dense document and if not, rejecting the document from further processing.

170. The method of claim 169, wherein the coded formatting comprises network markup language coding.

171. The method of claim 168 further comprising:

determining whether a 'neater document contains coded formatting, and if not, whether the member document is a dense document, and if not, rejecting the document from further processing.

172. The method of claim 171 wherein the coded formatting comprises network markup language formatting.

173. The method according to claim 167, further comprising:

verifying the extraction of application specific multi-dimensional information from the member documents.

174. The method according to claim 168, further comprising:

verifying the extraction of application specific multi-dimensional information from the member documents.

175. The method according to claim 169, further comprising:

verifying the extraction of application specific multi-dimensional information from the member documents.

176. The method according to claim 170, further comprising:

verifying the extraction of application specific multi-dimensional information from the member documents.

177. The method according to claim 171, further comprising:

verifying the extraction of application specific multi-dimensional information from the member documents.

178. The method according to claim 172, further comprising:

verifying the extraction of application specific multi-dimensional information from the member documents.

179. The method according to claim 173, further comprising:

storing the application specific multi-dimensional information and providing an application running on a user computing device access to the application specific multidimensional information.

180. The method according to claim 174, further comprising:

storing the application specific multi-dimensional information and providing an application running on a user computing device access to the application specific multidimensional information.

181. The method according to claim 175, further comprising:

storing the application specific multi-dimensional information and providing an application running on a user computing device access to the application specific multidimensional information.

182. The method according to claim 176, further comprising:

storing the application specific multi-dimensional information and providing an application running on a user computing device access to the application specific multidimensional information.

183. The method according to claim 177, further comprising:

storing the application specific multi-dimensional information and providing an application running on a user computing device access to the application specific multidimensional information.

184. An apparatus according to claim 178, further comprising:

a database means for storing the application specific multi-dimensional information and for providing an application running on a user computing device access to the application specific multidimensional information.

185. The method of claim 173 wherein the application specific multidimensional information verification gap further comprises:

comparing occurrences of application specific multidimensional information from more than one member document and thereby increasing the confidence level of the accuracy of the particular application specific multidimensional information.

186. The method of claim 174 wherein the application specific multidimensional information verification step further comprises:

comparing occurrences of application specific multidimensional information from more than one member document and thereby increasing the confidence level of the accuracy of the particular application specific multidimensional information.

187. The method of claim 175 wherein the application specific multidimensional information verification step further comprises:

comparing occurrences of application specific multidimensional information from more than one member document and thereby increasing the confidence level of the accuracy of the particular application specific multidimensional information.

188. The method of claim 176 wherein the application specific multidimensional information verification step further comprises:

comparing occurrences of application specific multidimensional information from more than one member document and thereby increasing the confidence level of the accuracy of the particular application specific multidimensional information.

189. The method of claim 177 wherein the application specific multidimensional information verification step further comprises:

comparing occurrences of application specific multidimensional information from more than one member document and thereby increasing the confidence level of the accuracy of the particular application specific multidimensional information.

190. The method of claim 178 wherein the application specific multidimensional information verification step further comprises:

comparing occurrences of application specific multidimensional information from more than one member document and thereby increasing the confidence level of the accuracy of the particular application specific multidimensional information.

191. The method according to claim 185, further comprising:

storing the application specific multi-dimensional information and providing an application running on a user computing device access to the application specific multidimensional information.

192. The method according to claim 186, further comprising:

storing the application specific multi-dimensional information and providing an application running on a user computing device access to the application specific multidimensional information.

193. The method according to claim 187, further comprising:

storing the application specific multi-dimensional information and providing an application running on a user computing device access to the application specific multidimensional information.

194. The method according to claim 188, further comprising:

storing the application specific multi-dimensional information and providing an application running on a user computing device access to the application specific multidimensional information.

195. The method according to claim 189, further comprising:

storing the application specific multi-dimensional information and providing an application running on a user computing device access to the application specific multidimensional information.

196. The method according to claim 190, further comprising:

storing the application specific multi-dimensional information and providing provide an application running on a user computing device access to the application specific multidimensional information.

197. The method of claim 185 wherein the comparing step further comprises comparing occurrences of incomplete elements of respective dimensions of the application specific multidimensional information.

198. The method of claim 186 wherein the comparing step further comprises comparing occurrences of incomplete elements of respective dimensions of the application specific multidimensional information.

199. The method of claim 187 wherein the comparing step further comprises comparing occurrences of incomplete elements of respective dimensions of the application specific multidimensional information.

200. The method of claim 188 wherein the comparing step further comprises comparing occurrences of incomplete elements of respective dimensions of the application specific multidimensional information.

201. The method of claim 189 wherein the comparing step further comprises comparing occurrences of incomplete elements of respective dimensions of the application specific multidimensional information.

202. The method of claim 190 wherein the comparing step further comprises comparing occurrences of incomplete elements of respective dimensions of the application specific multidimensional information.

203. The method of claim 197 further comprising:

storing the application specific multi-dimensional information and providing an application running on a user computing device access to the application specific multidimensional information.

204. The method of claim 198 further comprising:

storing the application specific multi-dimensional information and providing an application running on a user computing device access to the application specific multidimensional information.

205. The method of claim 199 further comprising:

storing the application specific multi-dimensional information and providing an application running on a user computing device access to the application specific multidimensional information.

206. The method of claim 200 further comprising:

storing the application specific multi-dimensional information and providing an application running on a user computing device access to the application specific multidimensional information.

207. The method of claim 201 further comprising:

storing the application specific multi-dimensional information and providing an application running on a user computing device access to the application specific multidimensional information.

208. The method of claim 202 further comprising:

storing the application specific multi-dimensional information and providing an application running on a user computing device access to the application specific multidimensional information.

209. A method for providing scheduled event information to an application running on a user computing device, wherein at least one dimension of the information is an event category, from a plurality of member documents electronically extracted from a library of electronically searchable documents, comprising:

extracting occurrences of prospective representations of the time, location and event identity from the member documents, and occurrences of non-prospective event related information from the member documents; and encoding the occurrences of prospective representations of the time, location and event identity information and non-prospective event related information contained in member documents according to a time, location and event identity specific coded representation of each of the occurrences of the time, location and event identity information and a coded representation of non-prospective event related information.

210. A method for providing scheduled event information to an application running on a user computing device, wherein at least one dimension of the information is an event category, from a plurality of member documents electronically extracted from a library of electronically searchable documents, comprising:

extracting occurrences of prospective representations of the time, location and event identity from the member documents, and occurrences of non-prospective event related information from the member documents; and determining whether a member document contains coded formatting, and if not whether the member document is a dense document, and if not, for rejecting the document from further processing.

211. The method of claim 210, wherein the coded formatting comprises network markup language coding.

212. The method of claim 211 further comprising:

determining whether a member document contains coded formatting, and if not whether the member document is a dense document, and if not, for rejecting the document from further processing.

213. The apparatus of claim 212 wherein the coded formatting comprises network markup language formatting.

214. A method for providing scheduled event information to an application running on a user computing device, wherein at least one dimension of the information is an event category, from a plurality of member documents electronically extracted from a library of electronically searchable documents, comprising:

extracting occurrences of prospective representations of the time, location and event identity from the member documents, and for extracting occurrences of non-prospective event related information from the member documents; and verifying the extraction of scheduled event information from the member documents.

215. The method according to claim 209, further comprising:

verifying the extraction of scheduled event information from the member documents.

216. The method according to claim 210, further comprising:

verifying the extraction of scheduled event information from the member documents.

217. The method according to claim 211, further comprising:

verifying the extraction of scheduled event information from the member documents.

218. The method according to claim 212, further comprising:

verifying the extraction of scheduled event information from the member documents.

219. The method according to claim 213, further comprising:

verifying the extraction of scheduled event information from the member documents.

220. The method according to claim 214, further comprising:

storing the scheduled event information and providing an application running on a user computing device access to the scheduled event information.

221. The method according to claim 215, further comprising:

storing the scheduled event information and providing an application running on a user computing device access to the scheduled event information.

222. The method according to claim 216, further comprising:

storing the scheduled event information and providing an application running on a us, computing device access to the scheduled event information.

223. The method according to claim 217, further comprising:

storing the scheduled event information and providing an application running on a user computing device access to the scheduled event information.

224. The method according to claim 218, further comprising:

storing the scheduled event information and providing an application running on a user computing device coca to the scheduled event information.

225. The method according to claim 219, further comprising:

storing the scheduled event information and providing an application running on a user computing device access to the scheduled event information.

226. The method of claim 214 wherein the scheduled event information verification step further comprises:

comparing occurrences of time, location or event identity information from more than one member document and increasing the confidence level of the accuracy of the scheduled event information.

227. The method of claim 215 wherein the scheduled event information verification step further comprises:

comparing occurrences of time, location or event identity information from more than one member document and increasing the confidence level of the accuracy of the scheduled event information.

228. The method of claim 216 wherein the scheduled event information verification step further comprises:

comparing occurrences of time, location or event identity information from more than one member document and increasing the confidence level of the accuracy of the scheduled event information.

229. The method of claim 217 wherein the scheduled event information verification step further comprises:

comparing occurrences of time, location or event identity information from more than one member document and increasing the confidence level of the accuracy of the scheduled event information.

230. The method of claim 218 wherein the scheduled event information verification step further comprises:

comparing occurrences of time, location or event identity information from more than one member document and increasing the confidence level of the accuracy of the scheduled event information.

231. The method of claim 219 wherein the scheduled event information verification step further comprises:

comparing occurrences of time, location or event identity information from more than one member document and increasing the confidence level of the accuracy of the scheduled event information.

232. The method according to claim 226, further comprising:

storing the scheduled event information and providing an application running on a user computing device access to the scheduled event information.

233. The method according to claim 227, further comprising:

storing the scheduled event information and providing an application running on a user computing device access to the scheduled event information.

234. The method according to claim 228, further comprising:

storing the scheduled event information and providing an application running on a user computing device access to the scheduled event information.

235. The method according to claim 229, further comprising:

storing the scheduled event information and providing an application running on a user computing device access to the scheduled event information.

236. The method according to claim 230, further comprising:

storing the scheduled event information and providing an application running on a user computing device access to the scheduled event information.

237. The method according to claim 231, further comprising:

storing the scheduled event information and providing an application running on a user computing device access to the scheduled event information.

238. The method of claim 226 wherein the comparing step further comprises comparing occurrences of incomplete elements of respective dimensions of the scheduled event information.

239. The method of claim 227 wherein the comparing step further comprises comparing occurrences of incomplete elements of respective dimensions of the scheduled event multidimensional information.

240. The method of claim 228 wherein the comparing step further comprises comparing occurrences of incomplete elements of respective dimensions of the scheduled event information.

241. The method of claim 229 wherein the comparing step further comprises comparing occurrences of incomplete elements of respective dimensions of the scheduled event information.

242. The apparatus of claim 230 wherein the comparing step further comprises comparing occurrences of incomplete elements of respective dimensions of the scheduled event information.

243. The method of claim 231 wherein the comparing step further comprises comparing occurrences of incomplete elements of respective dimensions of the scheduled event information.

244. The method of claim 238 further comprising:

storing the application specific multi-dimensional information and providing an application running on a user computing device access to the scheduled event information.

245. The method of claim 239 further comprising:

storing the application specific multi-dimensional information and providing an application running on a user computing device access to the scheduled event information.

246. The method of claim 240 further comprising:

storing the application specific multi-dimensional information and providing an application running on a user computing device access to the scheduled event information.

247. The method of claim 241 further comprising:

storing the application specific multi-dimensional information and for providing an application running on a user computing device access to the scheduled event information.

248. The method of claim 242 further comprising:

storing the application specific multi-dimensional information and for providing an application running on a user computing device access to the scheduled event information.

249. The method of claim 243 further comprising:

storing the application specific multi-dimensional information and for providing an application running on a user computing device access to the scheduled event information.

250. An apparatus for providing application specific multidimensional information to an application running on a user computing device, wherein at least one dimension of the information is a category, from a plurality of member documents electronically extracted from a library of electronically searchable documents, comprising:

an application specific multidimensional information extractor adapted to extract occurrences of prospective representations of dimensions of application specific multidimensional information from the member documents, and to extract occurrences of non-application specific multidimensional information from the member documents; and, an encoder adapted to encode the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element.

251. An apparatus for providing application specific multi-dimensional information to an application running on a user computing device, wherein at least one dimension of the information is a category, from a plurality of member documents electronically extracted from a library of electronically searchable documents, comprising:

an application specific multidimensional information extractor adapted to extract occurrences of prospective representations of dimensions of application specific multidimensional information from the member documents, and to extract occurrences of non-application specific multidimensional information from the member documents;

an encoder adapted to encode the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element; and, a member document identifier adapted to determine whether a member document contains coded formatting, and if not, whether the member document is a dense document, and if not, for rejecting the document from further processing.

252. An apparatus for providing application specific multi-dimensional information to an application running on a user computing device, wherein at least one dimension of the information is a category, from a plurality of member documents electronically extracted from a library of electronically searchable documents, comprising:

an application specific multidimensional information extractor adapted to extract occurrences of prospective representations of dimensions of application specific multidimensional information from the member documents, and to extract occurrences of non-application specific multidimensional information from the member documents;

an encoder adapted to encode the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element;

a member document identifier adapted to determine whether a member document contains coded formatting, and if not, whether the member document is a dense document, and if not, for rejecting the document from further processing; and, wherein the coded formatting comprises network markup language coding.

253. An apparatus for providing application specific multi-dimensional information to an application running on a user computing device, wherein at least one dimension of the information is a category, from a plurality of member documents electronically extracted from a library of electronically searchable documents, comprising:

an application specific multidimensional information extractor adapted to extract occurrences of prospective representations of dimensions of application specific multidimensional information from the member documents, and to extract occurrences of non-application specific multidimensional information from the member documents;

an encoder adapted to encode the occurrences of prospective dimensions of application specific multidimensional information and non-application specific multidimensional information contained in member documents according to a dimension specific coded representation of each dimension of application specific multidimensional information and a nonapplication specific coded representation of each nonapplication specific multidimensional information element; and an application specific multidimensional information verification unit adapted verify the extraction of application specific multi-dimensional information from the member documents.

254. An apparatus for providing application specific multi-dimensional information to an application running on a user computing device, wherein at least one dimension of the information is a category, from a plurality of member documents electronically extracted from a library of electronically searchable documents, comprising:

an application specific multidimensional information extractor adapted to extract occurrences of prospective representations of dimensions of application specific multidimensional information from the member documents, and to extract occurrences of non-application specific multidimensional information from the member documents;

an encoder adapted to encode the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element;

a member document identifier adapted to determine whether a member document contains coded formatting, and if not, whether the member document is a dense document, and if not, for rejecting the document from further processing; and, an application specific multidimensional information verification unit adapted verify the extraction of application specific multi-dimensional information from the member documents.

255. An apparatus for providing application specific multi-dimensional information to an application running on a user computing device, wherein at least one dimension of the information is a category, from a plurality of member documents electronically extracted from a library of electronically searchable documents, comprising:

an application specific multidimensional information extractor adapted to extract occurrences of prospective representations of dimensions of application specify multidimensional information from the member documents, and to extract occurrences of non-application specific multidimensional information from the member documents;

an encoder adapted to encode the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element;

a member document identifier adapted to determine whether a member document contains coded formatting, and if not whether the member document is a dense document, and if not, for rejecting the document from further processing;

wherein the coded formatting comprises network markup language coding; and, an application specific multidimensional information verification unit adapted verify, the extraction of application specific multi-dimensional information from the member documents.

256. An apparatus for providing application specific multi-dimensional information to an application running on a user computing device, wherein at least one dimension of the information is a category, from a plurality of member documents electronically extracted from a library of electronically searchable documents, comprising:

an application specific multidimensional information extractor adapted to extract occurrences of prospective representations of dimensions of application specific multidimensional information from the member documents, and to extract occurrences of non-application specific multidimensional information from the member documents;

an encoder adapted to encode the occurrences of prospective dimensions of application specific multidimensional information and non-application specific multidimensional information contained in member documents according to a dimension specific coded representation of each dimension of application specific multidimensional information and a non-application specific coded representation of each non-application specific multidimensional information element;

a member document identifier adapted to determine whether a member document contains coded formatting, and if not, whether the member document is a dense document, and if not, for rejecting the document from further processing;

wherein the coded formatting comprises network markup language coding;

an application specific multidimensional information verification unit adapted verify the extraction of application specific multi-dimensional information from the member documents; and, a database for storing the application specific multidimensional information adapted to provide an application running on a user computing device access to the application specific multidimensional information.

257. An apparatus for providing scheduled event information to an application running on a user computing device, wherein at least one dimension of the information is an event category, from a plurality of member documents electronically extracted from a library of electronically searchable documents, comprising:

an event information extractor adapted to extract occurrences of prospective representations of the time, location and event identity from the member documents, and to extract occurrences of non-prospective event related information from the member document; and, an encoder adapted to encode the occurrences of prospective representations of the time, location and event identity information and non-prospective event related information contained in member documents according to a time, location and event identity specific coded representation of each of the occurrences of the time, location and event identity information and a coded representation of non-prospective event related information.

258. An apparatus for providing scheduled event information to an application running on a user computing device, wherein at least one dimension of the information is an event category, from a plurality of member documents electronically extracted from a library of electronically searchable documents, comprising:

an event information extractor adapted to extract occurrences of prospective representations of the time, location and event identity from the member documents, and to extract occurrences of non-prospective event related information from the member documents;

an encoder adapted to encode the occurrences of prospective representations of the time, location and event identity information and non-prospective event related information contained in member documents according to a time, location and event identity specific coded representation of each of the occurrences of the time, location and event identity information and a coded representation of non-prospective event related information; and, a member document identifier adapted to determine whether a member document contains coded formatting, and if not, whether the member document is a dense document, and if not, for rejecting the document from further processing.

259. An apparatus for providing scheduled event information to an application running on a user computing device, wherein at least one dimension of the information is an event category, from a plurality of member documents electronically extracted from a library of electronically searchable documents, comprising:

an event information extractor adapted to extract occurrences of prospective representations of the time, location and event identity from the member documents, and to extract occurrences of non-prospective event related information from the member documents;

an encoder adapted to encode the occurrences of prospective representations of the time, location and event identity information and non-prospective event related information contained in member documents according to a time, location and event identity specific coded representation of each of the occurrences of the time, location and event identity information and a coded representation of non-prospective event related information;

a member document identifier adapted to determine whether a member document contains coded formatting, and if not, whether the member document is a dense document, and tr not for rejecting the document from further processing; and, wherein the coded formatting comprises network markup language coding.

260. An apparatus for providing scheduled event information to an application running on a user computing device, wherein at least one dimension of the information is an event category, from a plurality of member documents electronically extracted from a library of electronically searchable documents, comprising:

an event information extractor adapted to extract occurrences of prospective representations of the time, location and event identity from the member documents, and to extract occurrences of non-prospective event related information from the member documents;

an encoder adapted to encode the occurrences of prospective representations of the time, location and event identity information and non-prospective event related information contained in member documents according to a time, location and event identity specific coded representation of each of the occurrences of the time, location and event identity information and a coded representation of non-prospective event related information;

a member document identifier adapted to determine whether a member document contains coded formatting, and if not, whether the member document is a dense document, and if not for rejecting the document from further processing; wherein the coded formatting comprises network markup language coding;

a scheduled event verification it adapted verify the extraction of scheduled event information from the member documents.

261. An apparatus for providing scheduled event information to an application running on a user computing device, wherein at least one dimension of the information is an event category, from a plurality of member documents electronically extracted from a library of electronically searchable documents, comprising:

an event information extractor adapted to extract occurrences of prospective representations of the time, location and event identity from the member documents, and to extract occurrences of non-prospective event related information from the member documents;

an encoder adapted to encode the occurrences of prospective representations of the time, location and event identity information and non-prospective event related information contained in member documents according to a time, location and event identity specific coded representation of each of the occurrences of the time, location and event identity information and a coded representation of non-prospective event related information;

a member document identifier adapted to determine whether a member document contains coded formatting, and if not, whether the member document is a dense document, and if not, for rejecting the document from further processing;

wherein the coded formatting comprises network markup language coding;

a scheduled event verification unit adapted verify the extraction of scheduled event information from the member documents; and, a database for storing the scheduled event information adapted to provide an application running on a user computing device access to the scheduled event information.

* * * * *